US012786739B2

(12) United States Patent
Fujishiro et al.

(10) Patent No.: US 12,786,739 B2
(45) Date of Patent: Nov. 3, 2026

(54) COMMUNICATION CONTROL METHOD PERFORMED BY RELAY NODE

(71) Applicant: KYOCERA Corporation, Kyoto (JP)

(72) Inventors: Masato Fujishiro, Yokohama (JP); Henry Chang, San Diego, CA (US)

(73) Assignee: KYOCERA Corporation, Kyoto (JP)

( * ) Notice: Subject to any disclaimer, the term of this patent is extended or adjusted under 35 U.S.C. 154(b) by 495 days.

(21) Appl. No.: 18/474,639

(22) Filed: Sep. 26, 2023

(65) Prior Publication Data

US 2024/0031822 A1 Jan. 25, 2024

Related U.S. Application Data

(63) Continuation of application No. PCT/JP2022/013871, filed on Mar. 24, 2022.

(60) Provisional application No. 63/166,517, filed on Mar. 26, 2021.

(51) Int. Cl.

| | |
|---|---|
| ***H04W 16/26*** | (2009.01) |
| ***H04W 72/121*** | (2023.01) |
| ***H04W 72/56*** | (2023.01) |

(52) U.S. Cl.

CPC ......... *H04W 16/26* (2013.01); *H04W 72/121* (2013.01); *H04W 72/56* (2023.01)

(58) Field of Classification Search

CPC ... H04W 16/26; H04W 72/121; H04W 72/56; H04W 72/12; H04W 84/047; H04B 7/15542

See application file for complete search history.

(56) References Cited

U.S. PATENT DOCUMENTS

| | | | | |
|---|---|---|---|---|
| 2020/0145286 | A1 * | 5/2020 | Majmundar | H04W 24/02 |
| 2021/0266783 | A1 * | 8/2021 | Zhu | H04W 72/1268 |
| 2022/0070104 | A1 * | 3/2022 | Luo | H04B 7/15542 |

OTHER PUBLICATIONS

3rd Generation Partnership Project; Technical Specification Group Radio Access Network; NR; NR and NG-RAN Overall Description; Stage 2 (Release 16); 3GPP TS 38.300 V16.4.0; Dec. 2020; pp. 1-149.

* cited by examiner

*Primary Examiner* — Ricardo H Castaneyra
(74) *Attorney, Agent, or Firm* — Studebaker Brackett PLLC

(57) ABSTRACT

In an aspect, a communication control method is a communication control method performed by a relay node. The communication control method includes measuring, by the relay node, a delay time until untransmitted data to be transmitted to a parent node of the relay node via a logical channel is transferred to the relay node. The communication control method includes allocating, by the relay node, a resource for data transmission to the logical channel, based on the delay time.

7 Claims, 19 Drawing Sheets

COMMUNICATION CONTROL METHOD PERFORMED BY RELAY NODE

RELATED APPLICATIONS

The present application is a continuation based on PCT Application No. PCT/JP2022/013871, filed on Mar. 24, 2022, which claims the benefit of US Provisional Patent Application No. 63/166,517 filed on Mar. 26, 2021. The content of which is incorporated by reference herein in their entirety.

TECHNICAL FIELD

The present disclosure relates to a communication control method executed by a relay node.

BACKGROUND OF INVENTION

In the Third Generation Partnership Project (3GPP), which is a project for the standardization of cellular communication systems, introducing a new relay node referred to as an Integrated Access and Backhaul (IAB) node (for example, see "3GPP TS 38.300 V16.4.0 (2020 December)") is being considered. One or more relay nodes are involved in communication between a base station and a user equipment and perform relay for the communication.

SUMMARY

In a first aspect, a communication control method is a communication control method performed by a relay node. The communication control method includes measuring, by the relay node, a delay time until untransmitted data to be transmitted to a parent node of the relay node via a logical channel is transferred to the relay node. The communication control method includes allocating, by the relay node, a resource for data transmission to the logical channel, based on the delay time.

In a second aspect, a communication control method is a communication control method performed by a relay node. The communication control method includes acquiring, by the relay node, a first delay time and a second delay time individually, the first delay time being a time until a first packet to be transmitted to a parent node of the relay node through a logical channel, is transferred to the relay node, and the second delay time being a time until a second packet to be transmitted to the parent node of the relay node through a logical channel is transferred to the relay node. The communication control method includes allocating, by the relay node, a resource for data transmission to the logical channel with the second packet being prioritized over the first packet when the second delay time is longer than the first delay time.

In a third aspect, a communication control method is a communication control method performed by a first relay node and a second relay node. The communication control method includes transmitting, by the second relay node being a parent node of the first relay node, a special uplink (UL) grant to the first relay node, the special UL grant enabling the first relay node to transmit only a delayed packet. The communication control method includes transmitting, by the first relay node, the delayed packet to the second relay node according to the special UL grant.

In a fourth aspect, a communication control method is a communication control method performed by a first relay node and a second relay node. The communication control method includes calculating, by the first relay node being a child node of the second relay node, a delay value of a packet stored in a transmission buffer. The communication control method includes transmitting, by the first relay node, the delay value to the second relay node by using a buffer status report (BSR). The communication control method includes allocating, by the second relay node, a radio resource to the first relay node, based on the delay value.

DESCRIPTION OF EMBODIMENTS

A cellular communication system in an embodiment is described with reference to the drawings. In the description of the drawings, the same or similar parts are denoted by the same or similar reference signs.

Configuration of Cellular Communication System

First, a configuration example of the cellular communication system in an embodiment is described. In an embodiment, a cellular communication system 1 is a 3GPP 5th Generation (5G) system. Specifically, a radio access scheme in the cellular communication system 1 is New Radio (NR) being a 5G radio access scheme. Note that Long Term Evolution (LTE) may be at least partially applied to the cellular communication system. A future cellular communication system such as the 6G may be applied to the cellular communication system 1.

Figure 1:
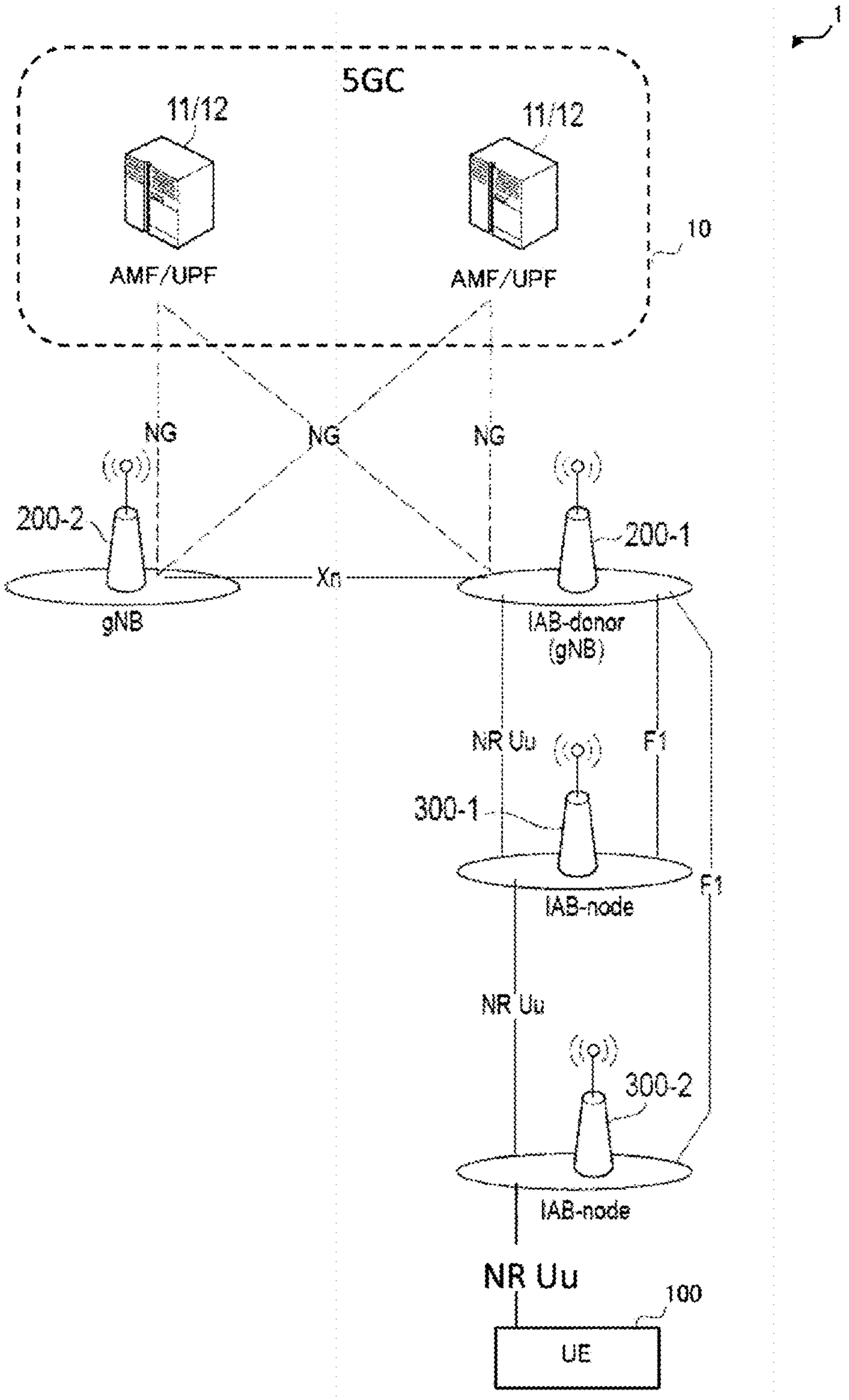
FIG. 1 is a diagram illustrating a configuration example of a cellular communication system according to an embodiment.

FIG. 1 is a diagram illustrating a configuration example of the cellular communication system 1 according to an embodiment.

As illustrated in FIG. 1, the cellular communication system 1 includes a 5G core network (5GC) 10, a User Equipment (UE) 100, base station apparatuses (hereinafter, also referred to as base stations in some cases) 200-1 and 200-2, and IAB nodes 300-1 and 300-2. The base station 200 may be referred to as a gNB.

An example in which the base station 200 is an NR base station is mainly described below, but the base station 200 may also be an LTE base station (i.e., an eNB).

Note that hereinafter, the base stations 200-1 and 200-2 may be referred to as a gNB 200 (or the base station 200 in some cases), and the IAB nodes 300-1 and 300-2 may be referred to as an IAB node 300.

The 5GC 10 includes an Access and Mobility Management Function (AMF) 11 and a User Plane Function (UPF) 12. The AMF 11 is an apparatus that performs various types of mobility controls and the like for the UE 100. The AMF 11 communicates with the UE 100 by using Non-Access Stratum (NAS) signaling, and thereby manages information of an area in which the UE 100 exists. The UPF 12 is an apparatus that performs transfer control of user data and the like.

Each gNB 200 is a fixed wireless communication node and manages one or more cells. The term "cell" is used to indicate a minimum unit of a wireless communication area. The term "cell" may be used to indicate a function or a resource for performing wireless communication with the UE 100. Hereinafter, a "cell" may be used without being distinguished from a base station such as the gNB 200. One cell belongs to one carrier frequency.

Each gNB 200 is interconnected to the 5GC 10 via an interface referred to as an NG interface. FIG. 1 illustrates a gNB 200-1 and a gNB 200-2 that are connected to the 5GC 10.

Each gNB 200 may be divided into a Central Unit (CU) and a Distributed Unit (DU). The CU and the DU are interconnected via an interface referred to as an F1 interface. An F1 protocol is a communication protocol between the CU and the DU and includes an F1-C protocol that is a control plane protocol and an F1-U protocol that is a user plane protocol.

The cellular communication system 1 supports an IAB that uses NR for the backhaul to enable wireless relay of the NR access. The donor gNB (or the donor node, hereinafter also referred to as the "donor node" in some cases) 200-1 is a donor base station that is a terminal node of the NR backhaul on the network side and includes additional functionality for supporting the IAB. The backhaul can implement multi-hop via a plurality of hops (i.e., a plurality of IAB nodes 300).

FIG. 1 illustrates an example in which the IAB node 300-1 is wirelessly connected to the donor node 200-1, the IAB node 300-2 is wirelessly connected to the IAB node 300-1, and the F1 protocol is transmitted in two backhaul hops.

The UE 100 is a mobile wireless communication apparatus that performs wireless communication with the cells. The UE 100 may be any type of apparatus as long as the UE 100 is an apparatus that performs wireless communication with the gNB 200 or the IAB node 300. For example, the UE 100 is a mobile phone terminal, a tablet terminal, a notebook PC, a sensor or an apparatus provided in the sensor, and/or a vehicle or an apparatus provided in the vehicle. The UE 100 is wirelessly connected to the IAB node 300 or the gNB 200 via an access link. FIG. 1 illustrates an example in which the UE 100 is wirelessly connected to the IAB node 300-2. The UE 100 indirectly communicates with the donor node 200-1 via the IAB node 300-2 and the IAB node 300-1.

Figure 2:
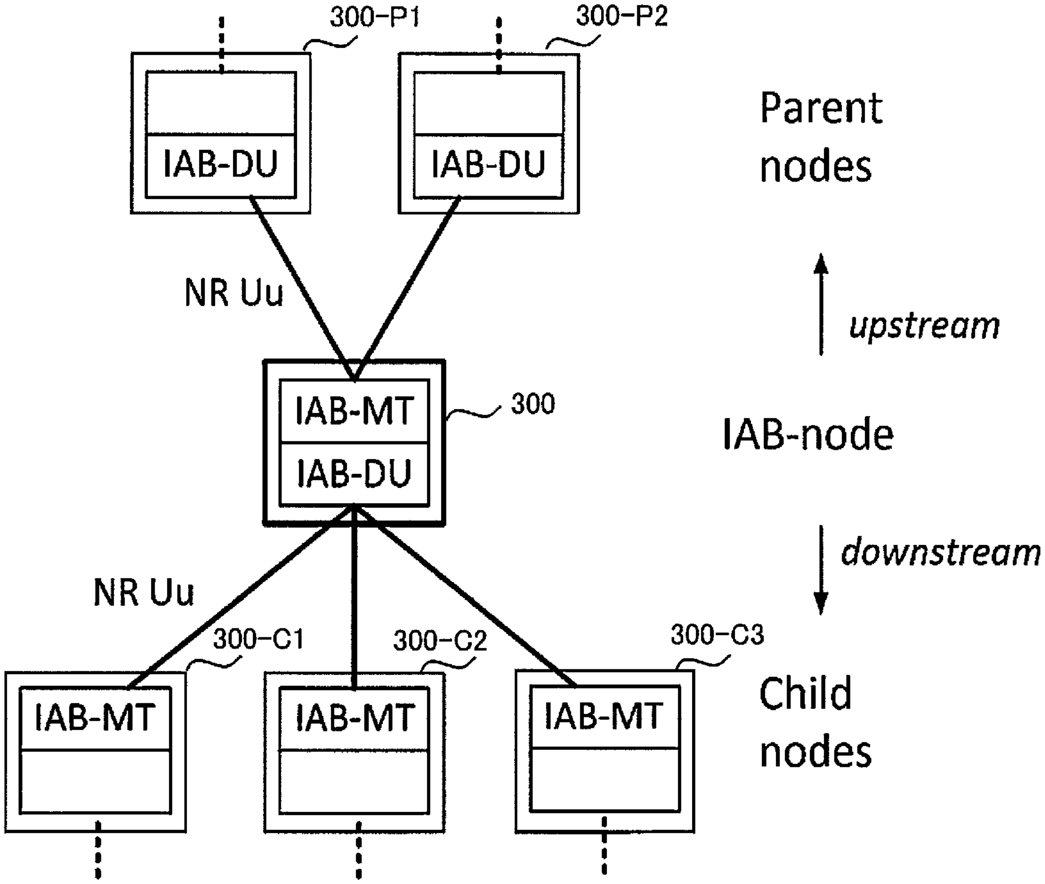
FIG. 2 is a diagram illustrating a relationship between an IAB node, Parent nodes, and Child nodes.

FIG. 2 is a diagram illustrating a relationship between the IAB node 300, parent nodes, and child nodes.

As illustrated in FIG. 2, each IAB node 300 includes an IAB-DU corresponding to a base station functional unit and an IAB-Mobile Termination (MT) corresponding to a user equipment functional unit.

Neighboring nodes of the IAB-MT (i.e., upper node) of an NR Uu wireless interface are referred to as "parent nodes". The parent node is the DU of a parent IAB node or the donor node 200. A radio link between the IAB-MT and each parent node is referred to as a backhaul link (BH link). FIG. 2 illustrates an example in which the parent nodes of the IAB node 300 are IAB nodes 300-P1 and 300-P2. Note that the direction toward the parent nodes is referred to as upstream. As viewed from the UE 100, the upper nodes of the UE 100 can correspond to the parent nodes.

Neighboring nodes of the IAB-DU (i.e., lower nodes) of an NR access interface are referred to as "child nodes". The IAB-DU manages cells in a manner the same as, and/or similar to the gNB 200. The IAB-DU terminates the NR Uu wireless interface connected to the UE 100 and the lower IAB nodes. The IAB-DU supports the F1 protocol for the CU of the donor node 200-1. FIG. 2 illustrates an example in which the child nodes of the IAB node 300 are IAB nodes 300-C1 to 300-C3; however, the UE 100 may be included in the child nodes of the IAB node 300. Note that the direction toward the child nodes is referred to as downstream.

All of the IAB nodes 300 connected to the donor node 200 via one or more hops form a Directed Acyclic Graph (DAG) topology (which may be referred to as "topology" below) rooted at the donor node 200. In this topology, the neighboring nodes of the IAB-DU in the interface are child nodes, and the neighboring nodes of the IAB-MT in the interface are parent nodes as illustrated in FIG. 2. The donor node 200 performs, for example, centralized management on resources, topology, and routes of the IAB topology. The donor node 200 is a gNB that provides a network access to the UE 100 via a backhaul link and access link networks.

Configuration of Base Station

Figure 3:
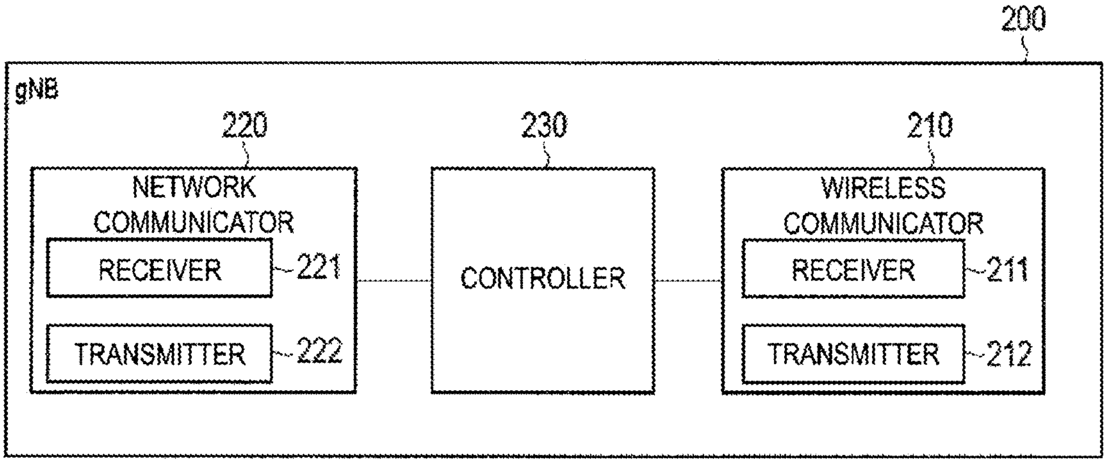
FIG. 3 is a diagram illustrating a configuration example of a gNB (base station) according to an embodiment.

A configuration of the gNB 200 that is a base station according to the embodiment is described. FIG. 3 is a diagram illustrating a configuration example of the gNB 200. As illustrated in FIG. 3, the gNB 200 includes a wireless communicator 210, a network communicator 220, and a controller 230.

The wireless communicator 210 performs wireless communication with the UE 100 and performs wireless communication with the IAB node 300. The wireless communicator 210 includes a receiver 211 and a transmitter 212. The receiver 211 performs various types of reception under control of the controller 230. The receiver 211, which includes an antenna, converts (down-converts) a radio signal received by the antenna into a baseband signal (reception signal) to output to the controller 230. The transmitter 212 performs various types of transmission under control of the controller 230. The transmitter 212, which includes an antenna, converts (up-converts) the baseband signal (transmission signal) output by the controller 230 into a radio signal to transmit from the antenna.

The network communicator 220 performs wired communication (or wireless communication) with the 5GC 10 and performs wired communication (or wireless communication) with another neighboring gNB 200. The network communicator 220 includes a receiver 221 and a transmitter 222. The receiver 221 performs various types of reception under control of the controller 230. The receiver 221 receives a signal from an external source and outputs the reception signal to the controller 230. The transmitter 222 performs various types of transmission under control of the controller 230. The transmitter 222 transmits the transmission signal output by the controller 230 to an external destination.

The controller 230 performs various types of controls for the gNB 200. The controller 230 includes at least one memory and at least one processor electrically connected to the memory. The memory stores a program to be executed by the processor and information to be used for processing by the processor. The processor may include a baseband processor and a Central Processing Unit (CPU). The baseband processor performs modulation and demodulation, coding and decoding, and the like of a baseband signal. The CPU executes the program stored in the memory to thereby perform various types of processing. The processor performs processing of the layers described below. In each example described below, the controller 230 may perform each processing operation in the gNB 200 (or the donor node 200).

Configuration of Relay Node

Figure 4:
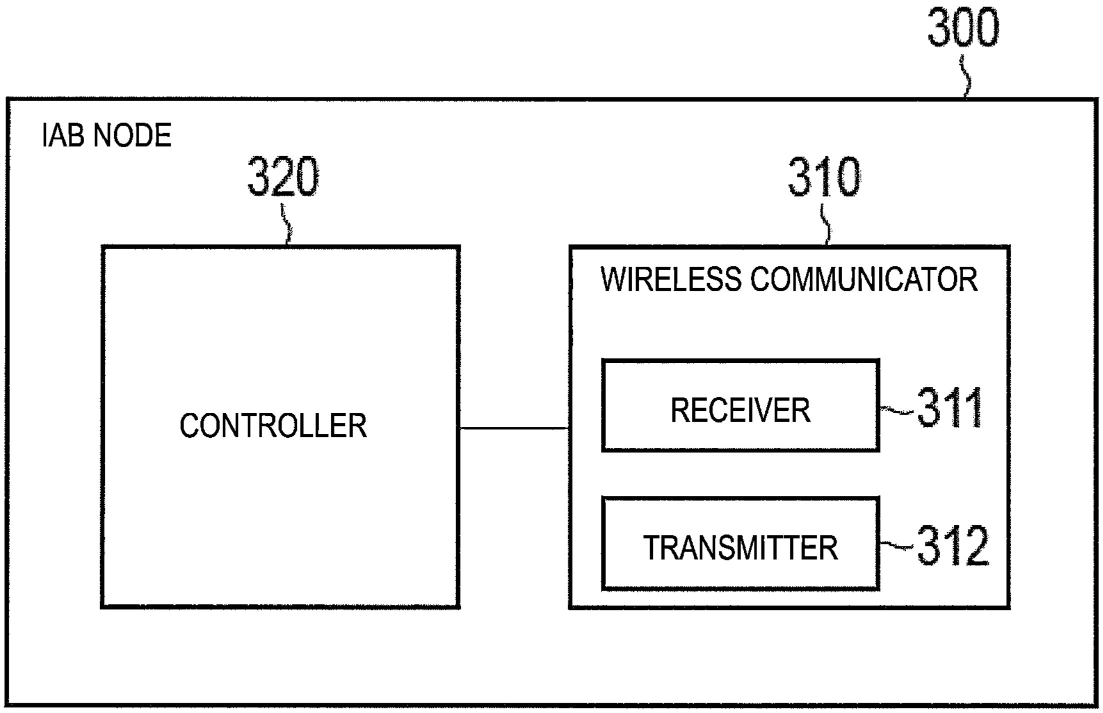
FIG. 4 is a diagram illustrating a configuration example of an IAB node (relay node) according to an embodiment.

A configuration of the IAB node 300 that is a relay node (or a relay node apparatus, which is also referred to as a relay node below in some cases) in the embodiment is described. FIG. 4 is a diagram illustrating a configuration example of the IAB node 300. As illustrated in FIG. 4, the IAB node 300 includes a wireless communicator 310 and a controller 320. The IAB node 300 may include a plurality of wireless communicators 310.

The wireless communicator 310 performs wireless communication with the gNB 200 (BH link) and wireless communication with the UE 100 (access link). The wireless communicator 310 for the BH link communication and the wireless communicator 310 for the access link communication may be provided separately.

The wireless communicator 310 includes a receiver 311 and a transmitter 312. The receiver 311 performs various types of reception under control of the controller 320. The receiver 311, which includes an antenna, converts (down-converts) a radio signal received by the antenna into a baseband signal (reception signal) to output to the controller 320. The transmitter 312 performs various types of transmission under control of the controller 320. The transmitter 312, which includes an antenna, converts (up-converts) the baseband signal (transmission signal) output by the controller 320 into a radio signal to transmit from the antenna.

The controller 320 performs various types of controls in the IAB node 300. The controller 320 includes at least one memory and at least one processor electrically connected to the memory. The memory stores a program to be executed by the processor and information to be used for processing by the processor. The processor may include a baseband processor and a CPU. The baseband processor performs modulation and demodulation, coding and decoding, and the like of a baseband signal. The CPU executes the program stored in the memory to thereby perform various types of processing. The processor performs processing of the layers described below. In each example described below, the controller 320 may perform each processing operation in the IAB node 300. The controller 320 may perform each function of the IAB-MT or the IAB-DU in the IAB node 300.

Configuration of User Equipment

Figure 5:
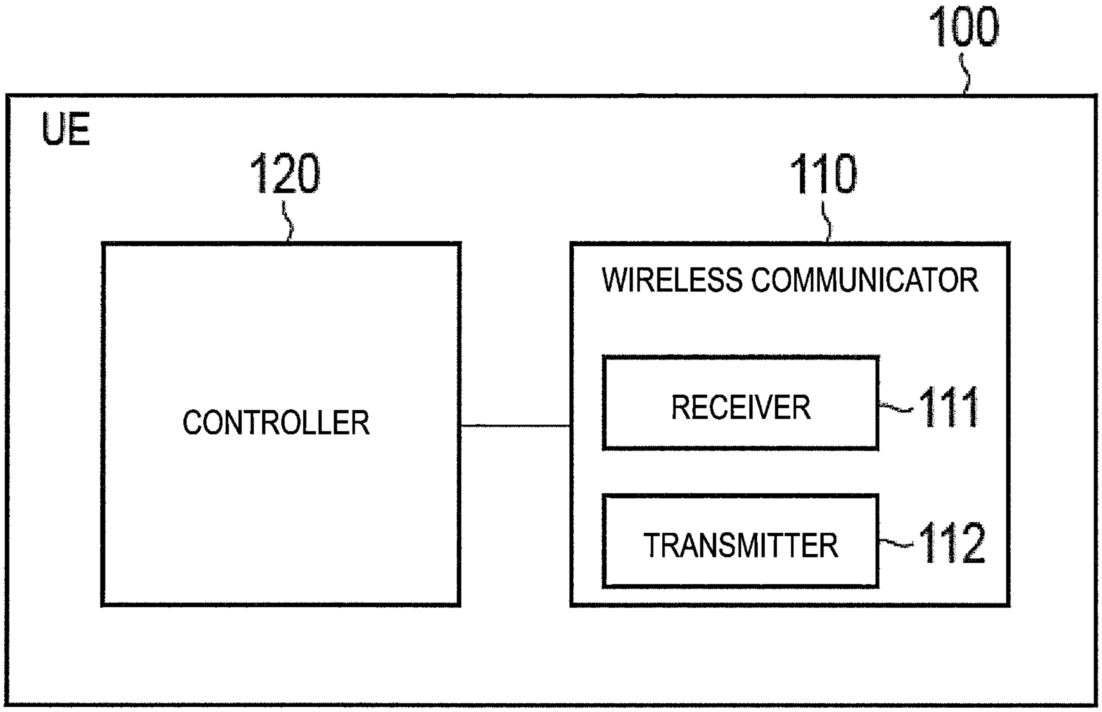
FIG. 5 is a diagram illustrating a configuration example of a UE (user equipment) according to an embodiment.

A configuration of the UE 100 that is a user equipment according to the embodiment is described next. FIG. 5 is a diagram illustrating a configuration example of the UE 100. As illustrated in FIG. 5, the UE 100 includes a wireless communicator 110 and a controller 120.

The wireless communicator 110 performs wireless communication in the access link, i.e., wireless communication with the gNB 200 and wireless communication with the IAB node 300. The wireless communicator 110 may also perform wireless communication in a sidelink, i.e., wireless communication with another UE 100. The wireless communicator 110 includes a receiver 111 and a transmitter 112. The receiver 111 performs various types of reception under control of the controller 120. The receiver 111 includes an antenna and converts (down-converts) a radio signal received by the antenna into a baseband signal (reception signal) which is then transmitted to the controller 120. The transmitter 112 performs various types of transmission under control of the controller 120. The transmitter 112 includes an antenna and converts (up-converts) the baseband signal (transmission signal) output by the controller 120 into a radio signal which is then transmitted from the antenna.

The controller 120 performs various types of control in the UE 100. The controller 120 includes at least one memory and at least one processor electrically connected to the memory. The memory stores a program to be executed by the processor and information to be used for processing by the processor. The processor may include a baseband processor and a CPU. The baseband processor performs modulation and demodulation, coding and decoding, and the like of a baseband signal. The CPU executes the program stored in the memory to thereby perform various types of processing. The processor performs processing of the layers described below. In each example described below, the controller 120 may perform each processing operation in the UE 100.

Configuration of Protocol Stack

Figure 6:
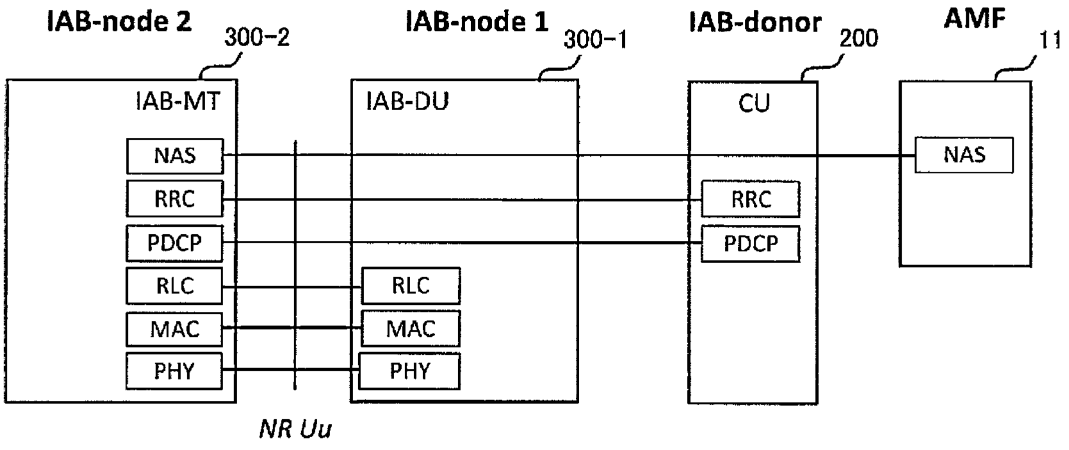
FIG. 6 is a diagram illustrating an example of a protocol stack related to an RRC connection and a NAS connection of an IAB-MT.

A configuration of a protocol stack according to the embodiment is described next. FIG. 6 is a diagram illustrating an example of a protocol stack related to an RRC connection and a NAS connection of the IAB-MT.

As illustrated in FIG. 6, the IAB-MT of the IAB node 300-2 includes a physical (PHY) layer, a Medium Access Control (MAC) layer, a Radio Link Control (RLC) layer, a Packet Data Convergence Protocol (PDCP) layer, a Radio Resource Control (RRC) layer, and a Non-Access Stratum (NAS) layer.

The PHY layer performs coding and decoding, modulation and demodulation, antenna mapping and demapping, and resource mapping and demapping. Data and control information are transmitted between the PHY layer of the IAB-MT of the IAB node 300-2 and the PHY layer of the IAB-DU of the IAB node 300-1 via a physical channel.

The MAC layer performs priority control of data, retransmission processing using a hybrid ARQ (HARQ), a random access procedure, and the like. Data and control information are transmitted between the MAC layer of the IAB-MT of the IAB node 300-2 and the MAC layer of the IAB-DU of the IAB node 300-1 via a transport channel. The MAC layer of the IAB-DU includes a scheduler. The scheduler determines the transport format (transport block size, modulation and coding scheme (MCS)) and the assignment of resource blocks in the uplink and the downlink.

The RLC layer transmits data to the RLC layer on the reception side by using functions of the MAC layer and the PHY layer. Data and control information are transmitted between the RLC layer of the IAB-MT of the IAB node 300-2 and the RLC layer of the IAB-DU of the IAB node 300-1 via a logical channel.

The PDCP layer performs header compression and decompression, and encryption and decryption. Data and control information are transmitted between the PDCP layer of the IAB-MT of the IAB node 300-2 and the PDCP layer of the donor node 200 via a radio bearer.

The RRC layer controls a logical channel, a transport channel, and a physical channel according to establishment, reestablishment, and release of a radio bearer. RRC signaling for various configurations is transmitted between the RRC layer of the IAB-MT of the IAB node 300-2 and the RRC layer of the donor node 200. When an RRC connection to the donor node 200 is present, the IAB-MT is in an RRC connected state. When no RRC connection to the donor node 200 is present, the IAB-MT is in an RRC idle state.

The NAS layer which is positioned higher than the RRC layer performs session management, mobility management, and the like. NAS signaling is transmitted between the NAS layer of the IAB-MT of the IAB node 300-2 and the AMF 11.

Figure 7:
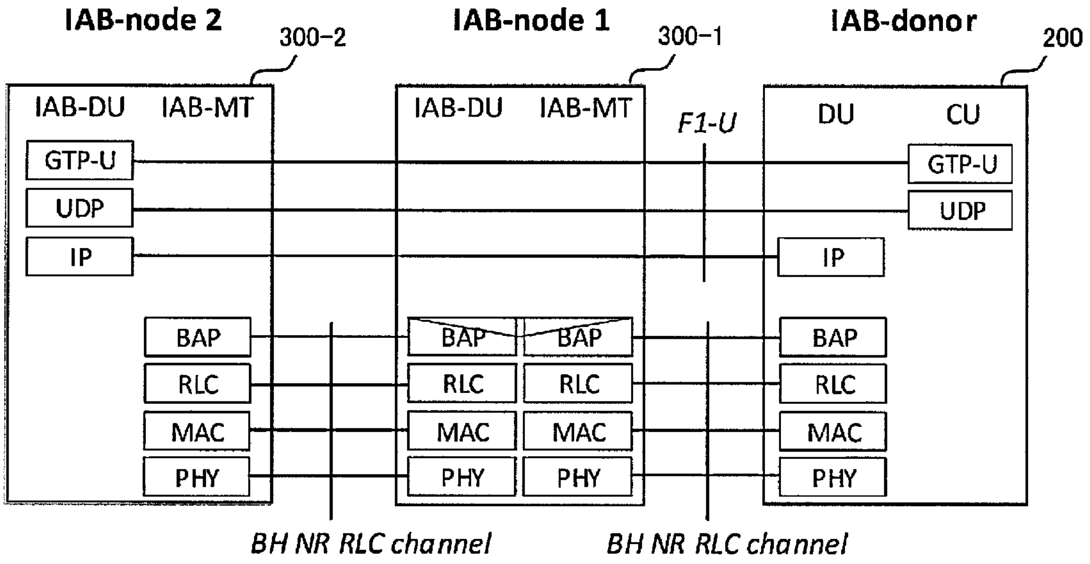
FIG. 7 is a diagram illustrating an example of a protocol stack related to an F1-U protocol.
Figure 8:
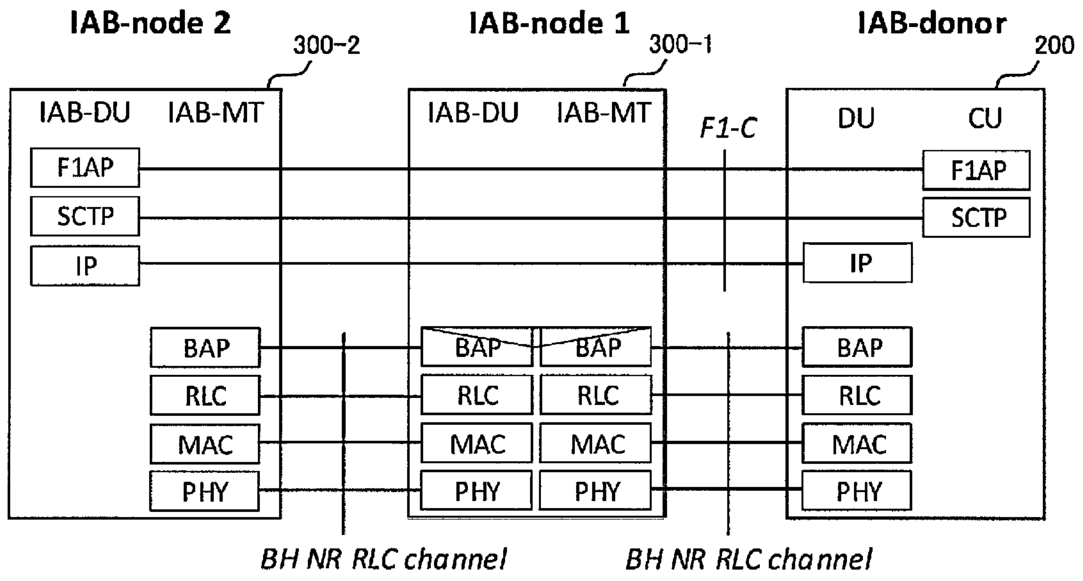
FIG. 8 is a diagram illustrating an example of a protocol stack related to an F1-C protocol.

FIG. 7 is a diagram illustrating a protocol stack related to an F1-U protocol. FIG. 8 is a diagram illustrating a protocol stack related to an F1-C protocol. An example is illustrated in which the donor node 200 is divided into a CU and a DU.

As illustrated in FIG. 7, each of the IAB-MT of the IAB node 300-2, the IAB-DU of the IAB node 300-1, the IAB-MT of the IAB node 300-1, and the DU of the donor node 200 includes a Backhaul Adaptation Protocol (BAP) layer as a higher layer of the RLC layer. The BAP layer performs routing processing, and bearer mapping and demapping processing. In the backhaul, the IP layer is transmitted via the BAP layer to allow routing through a plurality of hops.

In each backhaul link, a Protocol Data Unit (PDU) of the BAP layer is transmitted by the backhaul RLC channel (BH NR RLC channel). Configuring each BH link to include multiple backhaul RLC channels enables the prioritization and QoS control of traffic. The association between the BAP PDU and the backhaul RLC channel is executed by the BAP layer of each IAB node 300 and the BAP layer of the donor node 200.

Note that the CU of the donor node 200 is a gNB-CU function of the donor node 200 that terminates the F1 interface to the IAB node 300 and the DU of the donor node 200. The DU of the donor node 200 is a gNB-DU function of the donor node 200 that hosts an IAB BAP sublayer and provides a wireless backhaul to the IAB node 300.

As illustrated in FIG. 8, the protocol stack of the F1-C protocol includes an F1AP layer and an SCTP layer instead of a GTP-U layer and a UDP layer illustrated in FIG. 7.

Note that in the description below, processing or operation performed by the IAB-DU and the IAB-MT of the IAB may be simply described as processing or operation of the "TAB". For example, in the description, transmitting, by the IAB-DU of the IAB node 300-1, a message of the BAP layer to the IAB-MT of the IAB node 300-2 is assumed to correspond to transmitting, by the IAB node 300-1, the message to the IAB node 300-2. Processing or operation of the DU or CU of the donor node 200 may be described simply as processing or operation of the "donor node".

An upstream direction and an uplink (UL) direction may be used without distinction. A downstream direction and a downlink (DL) direction may be used without distinction.

First Embodiment

A first embodiment is described appropriately with reference to the drawings.

Overview of MAC Layer

Figure 9:
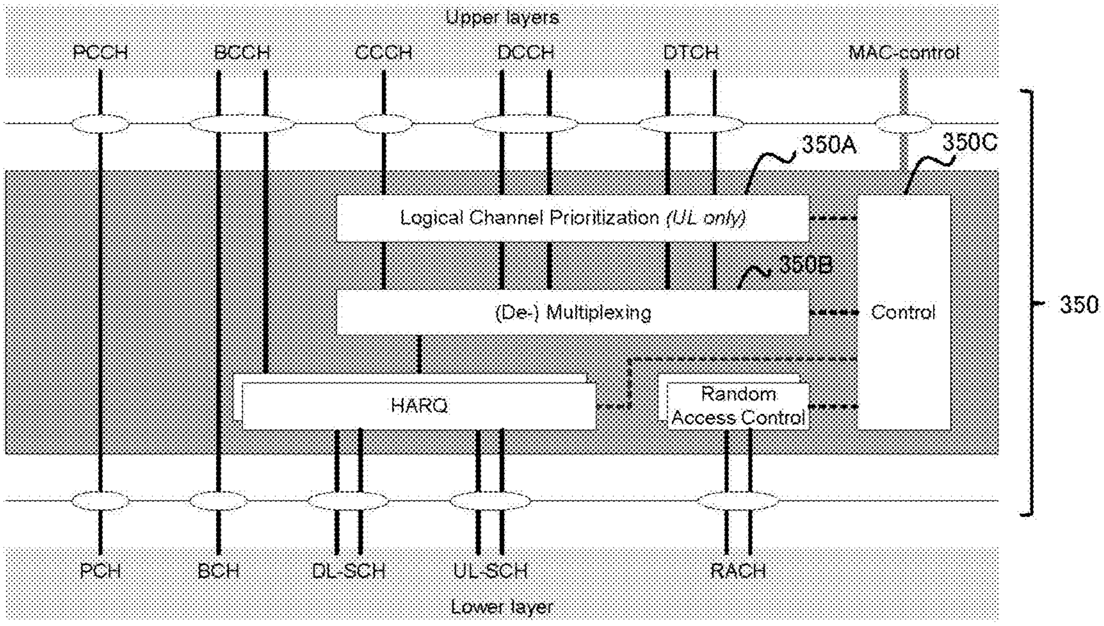
FIG. 9 is a diagram illustrating a configuration example of a MAC layer according to a first embodiment.

The MAC layer in the first embodiment is described. FIG. 9 is a diagram illustrating a configuration example of a MAC layer 350 of the IAB node 300 in the first embodiment. In general, FIG. 9 may be described as a configuration example of a MAC layer of the UE 100. However, the IAB-MT of the IAB node 300 has a UE function. Therefore, in the first embodiment, the MAC layer configuration illustrated in FIG. 9 is described below as the MAC layer configuration in the IAB-MT of the IAB node 300.

As illustrated in FIG. 9, the MAC layer 350 in the IAB-MT of the IAB node 300 includes a prioritization (Logical Channel Prioritization) unit 350A, a multiplexer (Multiplexing unit) 350B, and a MAC controller (Control unit) 350C.

The prioritization unit 350A performs logical channel prioritization (LCP) processing. Specifically, the prioritization unit 350A selects the data to be transmitted in order of priority, based at least on the priority configured for each of a plurality of logical channels.

The logical channels input to the prioritization unit 350A include a Common Control Channel (CCCH), a plurality of Dedicated Control Channels (DCCHs), and a plurality of Dedicated Traffic Channels (DTCHs).

The CCCH is a logical channel for transmitting control information common to UEs with no RRC connection. The DCCH is a logical channel for transmitting UE-dedicated (UE-specific) control information. The DTCH is a logical channel for transmitting UE-dedicated (UE-specific) data. The logical channel prioritization processing performed on the plurality of DTCHs will mainly be described below.

The prioritization unit 350A determines priority of transmission data, based on priority of each logical channel and a transmission bit rate (Prioritization Bit Rate (PBR)) at which transmission is to be performed within a certain period in consideration of Quality of Services (QoS) of the radio bearer.

The prioritization unit 350A maps data to a transport channel, to be more specific, a data block (Transport Block (TB)) transmitted by the PHY layer, in descending order of the priority at the time when the IAB-MT of the IAB node 300 receives the UL grant (or uplink radio resource allocation) transmitted from the parent node of the IAB node 300. Note that the MAC controller 350C acquires, from the RRC layer, information such as a logical channel number corresponding to each radio bearer, the priority of each logical channel, and PBR, when connecting to the parent node.

The prioritization unit 350A includes, for example, a transmission buffer corresponding to each logical channel. The prioritization unit 350A can perform the LCP processing for each logical channel by performing the LCP processing for each transmission buffer on the data (or packet) stored in each transmission buffer. The LCP processing is described below.

The multiplexer 350B multiplexes the data selected in the LCP processing by the prioritization unit 350A into the data block (transport channel). Specifically, the multiplexer 350B generates the data block by sequentially storing the data output from the prioritization unit 350A in the data block. The data block may be referred to as a MAC PDU or a transport block.

The MAC controller 350C controls the prioritization unit 350A and the multiplexer 350B, based on various parameters configured from the RRC layer.

In FIG. 9, a Hybrid Automatic Repeat Request (HARQ) function (or entity) further exists. The HARQ function is to transmit the data block (or forward the data block to the lower layer) while applying an HARQ to the data block output by the multiplexer 350B.

LCP Processing

Figure 10:
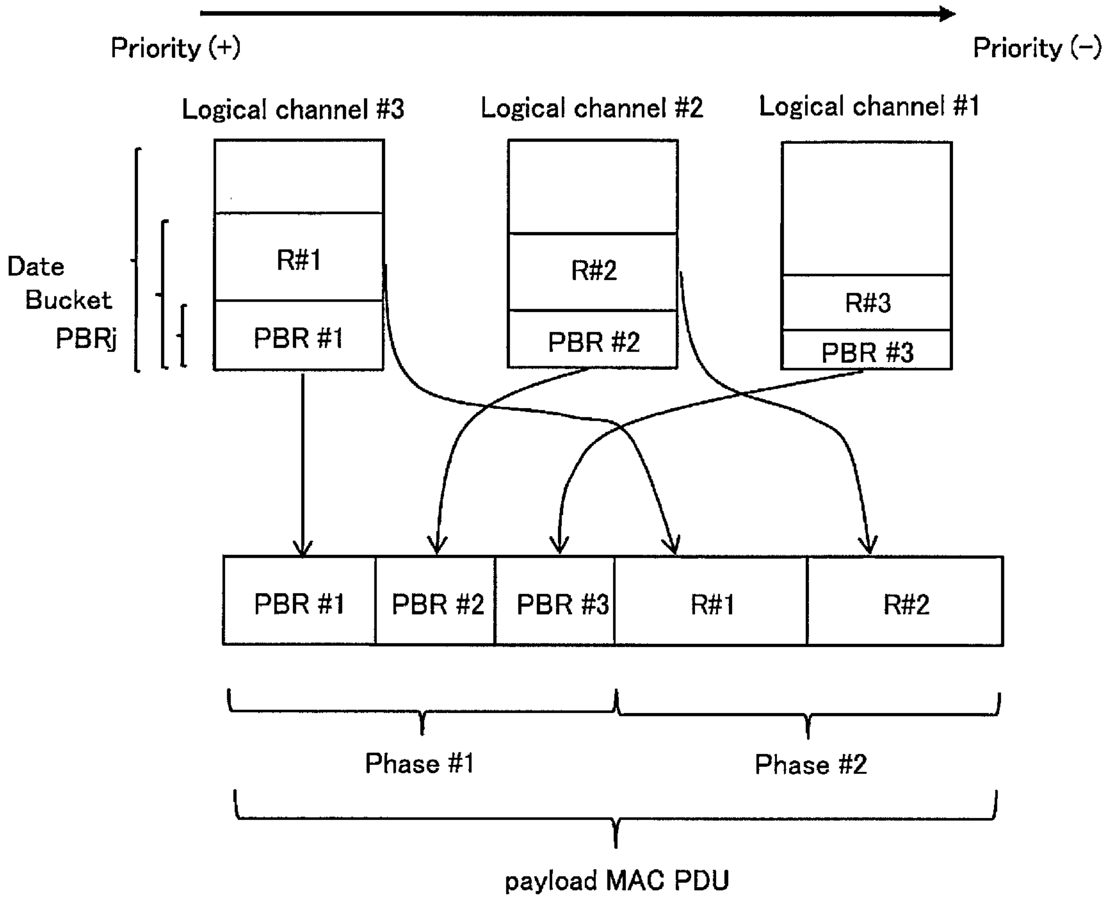
FIG. 10 is a diagram illustrating an example of LCP according to the first embodiment.

The LCP processing in the first embodiment is described. FIG. 10 is a diagram illustrating an example of the LCP processing.

The LCP processing is processing for determining what amount of data is to be allocated to which logical channel when pieces of data of a plurality of logical channels are multiplexed into one data block. The prioritization unit 350A performs the LCP processing each time the IAB node 300 performs a new transmission to the parent node (UL transmission).

As illustrated in FIG. 10, a priority is configured for each logical channel. A higher priority value indicates a lower priority level. For example, a priority value of "1" indicates the highest priority. In the example of FIG. 10, "Logical channel #3" is a logical channel having the highest priority, "Logical channel #2" is a logical channel having the second highest priority, and "Logical channel #1" is a logical channel having the lowest priority.

The Prioritized Bit Rate (PBR) is configured for each logical channel. The PBR is the lowest bit rate that is guaranteed for the logical channel.

The MAC layer 350 (e.g., prioritization unit 350A and MAC controller 350C) of the IAB node 300 determines an amount of transmission data for each logical channel using rules described below for uplink radio resources allocated by the parent node each time performing transmission to the parent node.

In a first phase (Phase #1), the MAC layer 350 allocates a resource corresponding to the PBR of each of logical channels to the corresponding logical channel in descending order of the priority of a logical channel. Here, the "resource" refers to the amount of data in the data block (payload MAC PDU) or a radio resource corresponding to the amount of data.

In the example illustrated in FIG. 10, the MAC layer 350 initially allocates a resource corresponding to PBR #1 of "Logical Channel #3" having the highest priority. The MAC layer 350 secondly allocates a resource corresponding to PBR #2 of "Logical Channel #2" having the second priority. Finally, the MAC layer 350 thirdly allocates a resource corresponding to PBR #3 of "Logical Channel #1" having the lowest priority.

In a second phase (Phase 2), when any resources remain allocatable, the MAC layer 350 performs resource allocation to the logical channel in descending order of the priority of a logical channel until the data of the logical channel or the remaining resources are exhausted.

In the example illustrated in FIG. 10, the MAC layer 350 allocates a resource R #1 to "Logical channel #3" having the highest priority, and a resource R #2 to "Logical channel #2" having the second priority. When the resource R #2 is allocated, the resource is exhausted.

Communication Control Method According to First Embodiment

In 3GPP, the following was agreed upon for the IAB. Specifically, "the IAB node cannot give more resources to the BH RLC CH that aggregates more bearers with higher load per bearer and/or the BH RLC CH that carries the bearers with higher load per bearer (i.e., the IAB node cannot give more resources to the BH RLC CH with higher aggregated load)."

In the IAB, an idea of topology-wide fairness (hereinafter, referred to as "fairness" in some cases) is used. The fairness provides, for example, a mechanism for managing Quality of Service (QoS) to meet the QoS required throughout the topology no matter what part of an IAB network the UE 100 connects to. For example, it can be considered that fairness is for managing the entire topology to achieve the same QoS whether the UE 100 is connected to the IAB node 300-2 or the donor node 200-1 in FIG. 1.

The above agreement is agreed for a problem that the current mechanism of not being able to allocate more radio resources to the BH RLC CH with higher load is an issue from the perspective of fairness.

On the other hand, in 3GPP, it is proposed to add the following additional information to the header of the BAP Data PDU.

A1: bearer ID

A2: bearer ID and hop count on particular path

A3: the number of UE Data Radio Bearers (DRBs) in particular BAP packet

As described above, by adding the additional information to the header of the BAP Data PDU, control can be performed on a per packet basis, for example, which bearer the packet (for example, the BAP packet) belongs to, what value the hop count of the packet has, or the like.

In a DL direction, the wireless packet scheduling depends on the implementation of the gNB 200, and for example, by using the additional information, priority control can be performed such that the transmission of a packet with a large delay is prioritized over other packets.

On the other hand, in a UL direction, priority control is performed in units of logical channels in accordance with the above-described LCP. Therefore, even if a delayed packet exists in a logical channel having a lower priority than others, the IAB-MT of the IAB node 300 cannot transmit the packet to the parent node with a higher priority than others. The parent node can grasp a buffer amount of the child node from the BSR. However, the parent node cannot grasp a delay state of the data stored in the child node. Therefore, when the parent node receives BSRs from a plurality of child nodes, the parent node cannot determine to give more resources to "a child node that stores data in which a delay has already occurred and stores less data" rather than to "a child node that stores data with a margin for delay and stores more data". From the viewpoint of the parent node, large implementation dependency to the child node (IAB-MT) exists and the above-described fairness management may be inexecutable.

As described above, in the UL direction, priority control is performed on a per logical channel basis by the LCP, and a problem exists in that the transmission of a delayed packet (or data included in the delayed packet) cannot be prioritized over others.

In the LCP, it is conceivable to newly introduce a residence time for residence in the UE 100, allocate a resource for data transmission to a logical channel based on the residence time, and enable preferential transmission before the residence time reaches a residence upper limit time.

However, in this case, although the residence time for residence in the UE 100 is taken into consideration, a delay occurring in a multi-hop network (or topology) constructed by the donor node 200 is not taken into consideration. For this reason, when UL transmission is performed in a multi-hop network, the transmission of a delayed packet may be inexecutable with a higher priority than others.

In the first embodiment, first, the relay node (IAB node 300) measures the delay time until the untransmitted data to be transmitted to the parent node of the relay node via the logical channel is transferred to the relay node. Second, the relay node allocates a resource for data transmission to the logical channel, based on the delay time. At this occasion, when the delay time reaches a predetermined time, the relay node allocates resources more than a predetermined resource to the logical channel regardless of the priority configured for the logical channel. Here, the predetermined time is shorter than an upper limit time. The predetermined resource is a minimum resource guaranteed for the logical channel (i.e., the resource corresponding to the PBR). When this allows the resources for data transmission to be subjected to UL transmission in the multi-hop network, the IAB node 300 can preferentially transmit the delayed data to the parent node.

Figure 11:
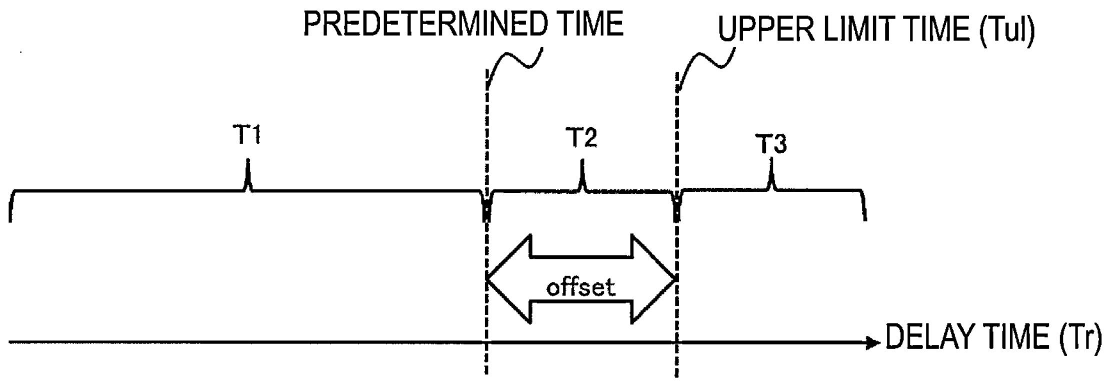
FIG. 11 is a diagram illustrating an example of delay time according to the first embodiment.

FIG. 11 is a diagram illustrating an example of a communication control method in the first embodiment.

As illustrated in FIG. 11, the MAC layer 350 in the IAB-MT of the IAB node 300 performs normal LCP processing when the delay time (Tr) is within a period T1 before the delay time (Tr) is equal to the predetermined time. When the delay time (Tr) is equal to the predetermined time, specifically, when the delay time (Tr) is within a period ranging from the predetermined time of T1 to the upper limit time (Tu1) of T1 plus T2, the MAC layer 350 performs priority resource allocation on a target logical channel. As described above, the resource is preferentially allocated to the delayed data in the target logical channel, allowing preferential transmission of the delayed data. Hereinafter, one logical channel to which the communication control method in the first embodiment is applied may be referred to as a "target logical channel".

Note that, for example, when an amount of uplink radio resources allocated to the IAB node 300 from the parent node is insufficient, the delay time (Tr) in the target logical channel may exceed the upper limit time (Tu1) even when the priority resource allocation is performed (in the period T3 in FIG. 11). In such a case, the MAC layer 350 may not transmit but discard the data for which the delay time (Tr) exceeds the upper limit time (Tu1).

Figure 12:
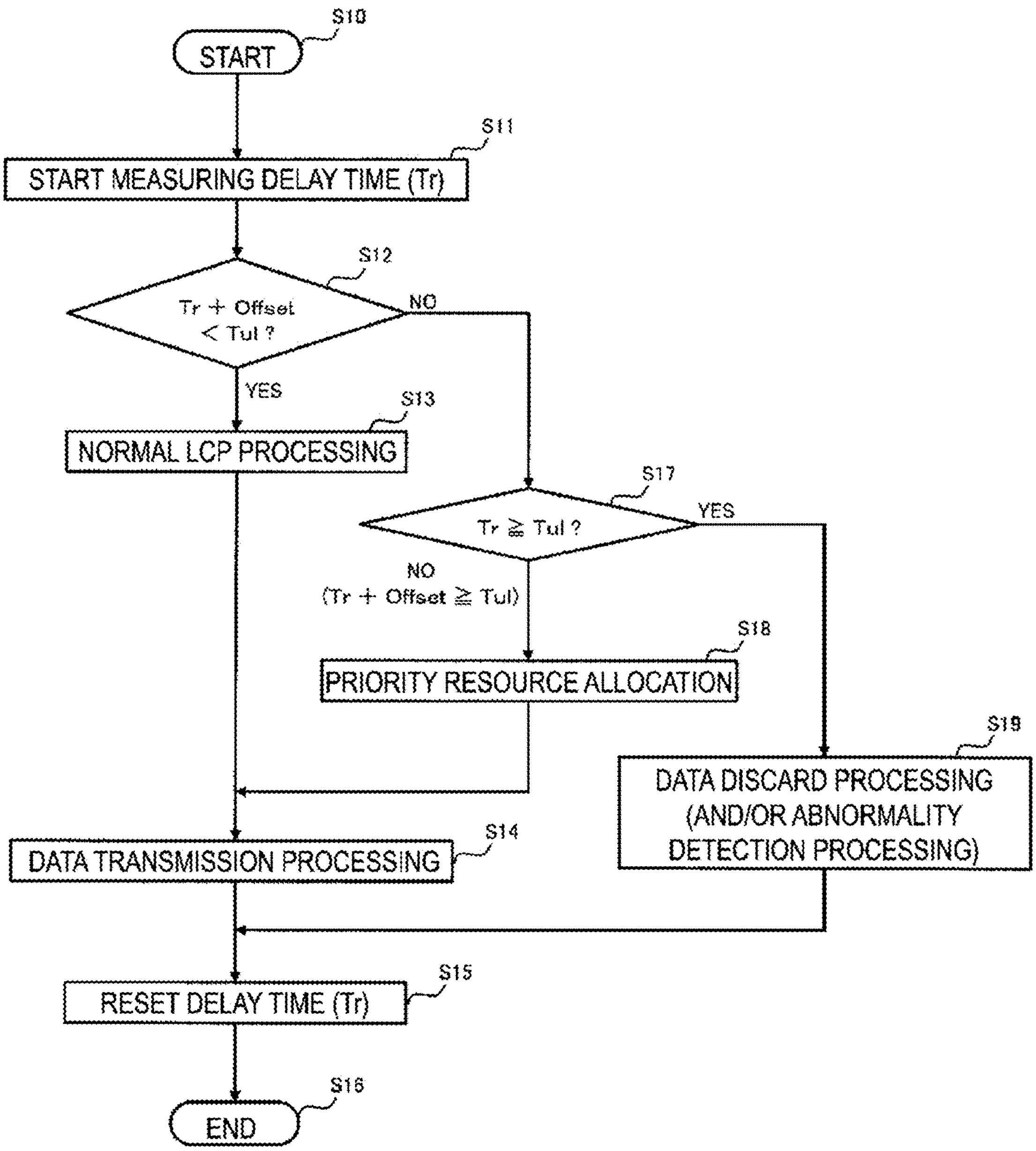
FIG. 12 is a flowchart illustrating an operation example according to the first embodiment.

FIG. 12 is a flowchart illustrating an operation example of the communication control method according to the first embodiment.

In step S10, the MAC layer 350 in the IAB-MT of the IAB node 300 (hereinafter, referred to as the "MAC layer 350" in some cases) starts processing.

In step S11, the MAC layer 350 starts measuring the delay time (Tr) until the untransmitted data is transferred to the IAB node 300. The MAC layer 350 may start measuring the delay time (Tr) at timing when the untransmitted data is stored in the transmission buffer associated with the target logical channel, or may start measuring the delay time (Tr) immediately before the untransmitted data is transmitted. Note that the data stored in the transmission buffer may be referred to as the untransmitted data.

The MAC layer 350 measures the delay time (Tr) by using information of a header of a packet (for example, BAP Data PDU) including the untransmitted data. For example, the MAC layer 350 measures the delay time (Tr) as follows.

First, the delay time for one packet is measured from the hop count included in the header of the packet. Specifically, the MAC layer 350 acquires the hop count of the packet from header information of the packet stored in the transmission buffer corresponding to the target logical channel. The MAC layer 350 measures the delay time for one packet by multiplying the acquired hop count by the delay time per hop. The delay time per hop may be notified by way of an RRC message from the donor node 200, or by way of a BAP Control PDU or MAC CE from the parent node. Alternatively, the MAC layer 350 may use the hop count as it is as the delay time for one packet.

The MAC layer 350 measures the delay time (Tr) of the untransmitted data in the target logical channel by adding the delay time for one packet to all the BAP Data PDUs stored in the transmission buffer. Instead of the addition, an average value (or a maximum value or a minimum value) may be taken.

As described above, in the first embodiment, when measuring the delay time (Tr), the MAC layer 350 measures the delay time by using, for example, the hop count included in the header of the BAP Data PDU. As a result, the MAC layer 350 can measure the delay time (Tr) in consideration of the delay occurring until the packet is transferred to the IAB node 300 in the multi-hop network. The delay time (Tr) represents the time until the untransmitted data (or packet) after transmitted from the UE 100 is transferred to the IAB node 300.

Note that the MAC layer 350 measures the delay time (Tr) for each transmission buffer across all the transmission buffers, thereby measuring the delay time (Tr) for each logical channel across all the logical channels.

In step S12, the MAC layer 350 determines whether the time obtained by adding an offset time (Offset) to the delay time (Tr) of the untransmitted data in the target logical channel is less than the upper limit time (Tu1). The offset time (Offset) may be a variable parameter configured for the IAB node 300 from the parent node for each logical channel, or configured for the IAB node 300 from the donor node 200 through an RRC message or the like. The offset may be configured to 0 or may not be configured. When no configuration is performed, the offset can be considered to be 0.

When the time obtained by adding the offset time (Offset) to the delay time (Tr) of the untransmitted data in the target logical channel is less than the upper limit time (Tu1) (YES in step S12), the MAC layer 350 performs the normal LCP processing in step S13. Specifically, when the delay time (Tr) is within the period T1 in FIG. 11, the MAC layer 350 performs the normal LCP processing in step S13.

In step S14, when the resource allocation to each logical channel ends through the normal LCP processing, the MAC layer 350 generates a data block (payload MAC PDU) from the data of each logical channel and provides the generated data block to the PHY layer. The data block is then transmitted from the IAB node 300 to the parent node.

In step S15, the MAC layer 350 resets the measured delay time (Tr) to zero in response to completion of the data transmission process in step S14.

In step S16, the MAC layer 350 ends the series of processing operations.

On the other hand, in step S12, when the time obtained by adding the offset time (Offset) to the delay time (Tr) of the untransmitted data in the target logical channel is equal to or greater than the upper limit time (Tu1) (NO in step S12), the MAC layer 350 performs step S17.

Specifically, in step S17, the MAC layer 350 determines whether the delay time (Tr) of the untransmitted data in the target logical channel is equal to or greater than the upper limit time (Tu1).

In step S17, when the delay time (Tr) of the untransmitted data in the target logical channel does not exceed the upper limit time (Tu1) (NO in step S17), in other words, when the delay time (Tr) is within a period ranging from the period T1 to the period T1 plus T2 in FIG. 11, the MAC layer 350 performs step S18.

Specifically, in step S18, the MAC layer 350 performs the priority resource allocation. The priority resource allocation is processing for allocating, to the target logical channel, the resource more than the PBR configured for the target logical channel, regardless of the priority configured for the target logical channel. In the priority resource allocation processing, the MAC layer 350 may allocate, to the target logical channel, a resource obtained by multiplying the PBR configured for the target logical channel by the delay time (Tr). The MAC layer 350 may consider the target logical channel to have the highest priority (e.g., the priority "0", which is higher than the highest priority value "1" that can be configured by the parent node). Thereafter, the processing proceeds to step S14, and the above-described processing is performed.

On the other hand, in step S17, when the delay time (Tr) is equal to or greater than the upper limit time (Tu1) (YES in step S17), in other words, when the delay time (Tr) is within a time period ranging from the period T1 plus T2 to the period T1 plus T2 plus T3 in FIG. 11, the MAC layer 350 performs step S19.

Specifically, in step S19, the MAC layer 350 performs data discard processing for discarding the untransmitted data in the target logical channel. Note that instead of or in addition to the data discard processing, the MAC layer 350 may perform abnormality detection processing.

Here, the abnormality detection processing is processing for detecting or notifying occurrence of an abnormality. The abnormality detection processing may include processing for detecting a Radio Link Failure (RLF). In this case, the MAC layer 350 detects an RLF and performs RRC reestablishment processing. The abnormality detection processing may include processing for notifying the parent node or the donor node 200 of the abnormality. In this case, the MAC layer 350 may notify the donor node 200 by using an RRC message or the like, or may notify the parent node using a MAC CE, a BAP Control PDU, or the like. The abnormality detection processing may include processing for notifying the higher layer (e.g., RLC layer, BAP layer, or the like) of the abnormality from the MAC layer 350. Thereafter, the processing proceeds to step S15, and the above-described processing is performed.

As described above, according to the first embodiment, the MAC layer 350 of the IAB node 300 measures the delay time (Tr) until the untransmitted data to be transmitted to the parent node via the logical channel is transferred to the IAB node 300, and allocates, based on the delay time (Tr), a resource for data transmission to the logical channel. The MAC layer 350 can preferentially transmit the untransmitted data to the parent node before the delay time (Tr) occurring in the multi-hop network reaches the upper limit time (Tu1). The operation by the MAC layer 350 in each step in FIG. 12 may be configured for the IAB node 300 (MAC layer 350) from the gNB (donor node) 200.

Second Embodiment

In the first embodiment, the example is described in which the delay time (Tr) in the logical channel is measured, and when the delay time (Tr) satisfies a certain condition, the allocation of resource equal to or greater than the PBR is performed on the logical channel.

In contrast, a second embodiment is an example in which a resource is allocated, with giving priority to a packet, in a logical channel, having a larger delay compared to other packets. Specifically, first, a relay node (for example, the IAB node 300) acquires first and second delay times until first and second packets to be transmitted to a parent node of the relay node via a logical channel are transferred to the relay node, respectively. Second, when the second delay time is longer than the first delay time, the relay node allocates, with giving priority to the second packet than the first packet, the resource for data transmission to the logical channel. This allows, for example, priority control of the packets in the logical channel to be executed.

Figure 13:
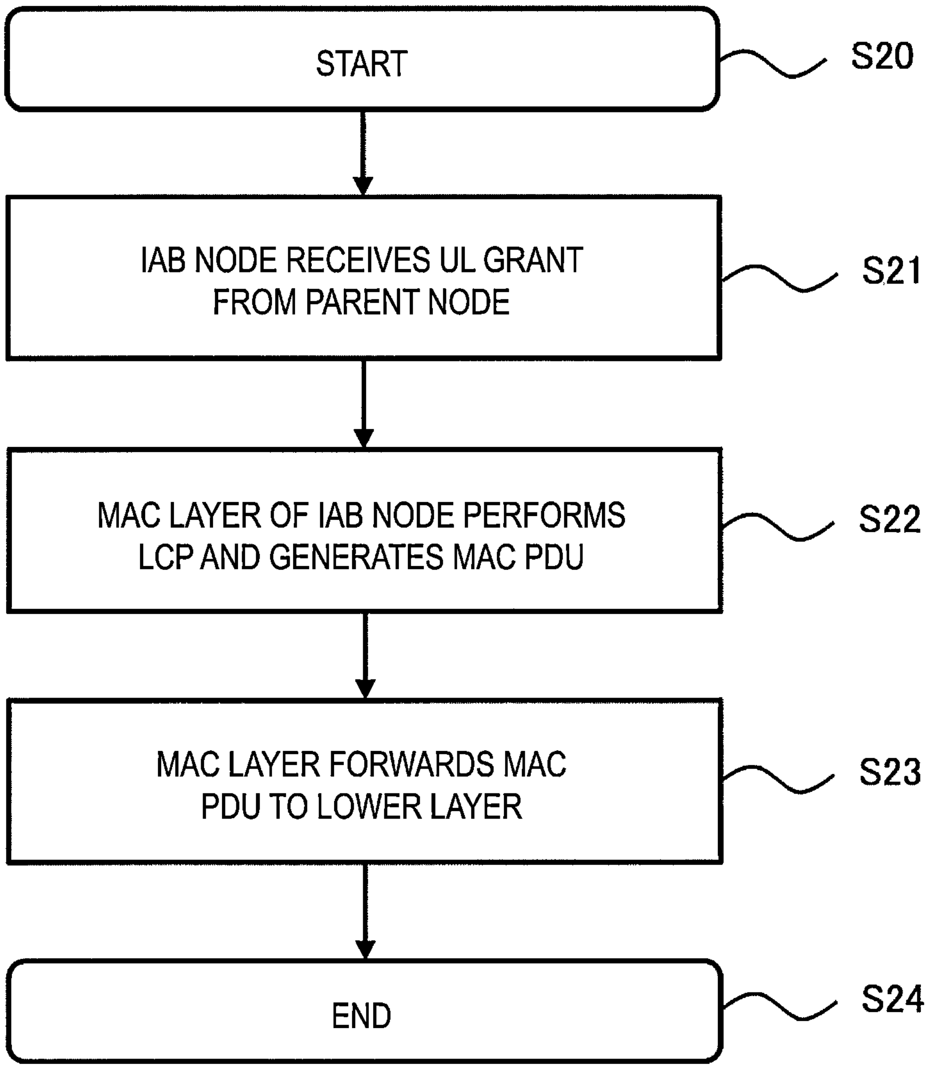
FIG. 13 is a flowchart illustrating an operation example according to a second embodiment.

FIG. 13 is a flowchart illustrating an operation example according to the second embodiment.

In step S20, the MAC layer 350 in the IAB-MT of the IAB node 300 starts processing.

In step S21, the MAC layer 350 receives the UL grant from the parent node.

In step S22, the MAC layer 350 performs the LCP processing to generate a MAC PDU. Specifically, the MAC layer 350 allocates a resource to each logical channel according to the priority configured for each logical channel. Details of step S22 are described below in the example of FIG. 10.

Specifically, the MAC layer 350 executes the first phase (Phase #1).

First, in the first phase (Phase #1), the MAC layer 350 allocates a resource corresponding to the PBR to "Logical Channel #3" having the higher priority. At this time, the MAC layer 350 acquires a delay time from each packet (for example, BAP Data PDU) in "Logical Channel #3". Specifically, the MAC layer 350 acquires the delay time from each packet stored in the transmission buffer corresponding to "Logical Channel #3". The delay time may be the hop count itself included in the BAP Data PDU and/or a value calculated from the hop count as in the first embodiment. The MAC layer 350 allocates a resource corresponding to the PBR with giving priority to a packet having a longer delay time (or a larger hop count). When the delay time is the hop count, the MAC layer 350 may compare the hop count with a threshold value to allocate a resource with giving priority to a packet having a delay time larger than the threshold value. The MAC layer 350 may compare the hop counts of the respective packets to allocate a resource with giving priority to a packet having the difference larger than a threshold value. For example, the MAC layer 350 allocates a resource with giving more priority to a packet having a difference of "5" (hop count=6) or more compared to a packet having a hop count=1. The MAC layer 350 may perform the normal LCP processing without performing priority control on a packet having the difference smaller than the threshold value. The threshold value may be configured (designated or indicated) from the donor node 200 or the parent node.

The MAC layer 350 allocates a resource corresponding to the PBR to "Logical Channel #2" having the second highest priority. Also in this case, the MAC layer 350 acquires the delay time of each packet in "Logical Channel #2", and allocates a resource corresponding to the PBR with giving priority to the packet having the longer delay time. At this time, the MAC layer 350 allocates a resource in an order from the packet having the longer delay time, based on the threshold value comparison or the hop count comparison described above.

Finally, the MAC layer 350 also similarly acquires a delay time for each packet for "Logical Channel #1", and allocates a resource corresponding to the PBR with giving priority to a packet having the longer delay time.

The MAC layer 350 executes the second phase (Phase #2). In the second phase (Phase #2), the MAC layer 350 first allocates the resource R #1 to "Logical Channel #3". At this time, the MAC layer 350 allocates the resource R #1 with giving priority to a packet having the longer delay time (or a large hop count) among the remaining packets where the resource corresponding to the PBR is not allocated to "Logical Channel #3".

The MAC layer 350 allocates the resource R #2 to "Logical Channel #2". At this time, the MAC layer 350 also allocates the resource R #2 with giving priority to a packet having the longer delay time among the remaining packets where the resource corresponding to the PBR is not allocated to "Logical Channel #2".

In the example of FIG. 10, after R #2 is allocated to "Logical Channel #2", no allocable resource is present. As a result, the LCP processing ends, and the MAC layer 350 generates a data block (payload MAC PDU) from the data of each logical channel.

As described above, the MAC layer 350 acquires the delay time for each packet in the logical channel, and allocates a resource (resource corresponding to the PBR in the first phase, and R #1, R #2, and the like in the second phase) with giving priority to the packet having the longer delay time.

Referring back to FIG. 13, in step S23, the MAC layer 350 provides the generated data block (payload MAC PDU) to the lower layer (PHY layer). The data block is transmitted from the IAB node 300 to the parent node.

In step S24, the MAC layer 350 ends the series of processing operations.

Third Embodiment

A third embodiment is an example of introducing a delay priority PBR in which a resource is allocated to a logical channel prior to (or temporally earlier than) a resource corresponding to an existing PBR.

In the delay priority PBR, when a resource corresponding to the delay priority PBR is allocated to a logical channel, allocation of the resource is executed in the logical channel giving priority to the packet having the longer delay time as described in the second embodiment.

Figure 14:
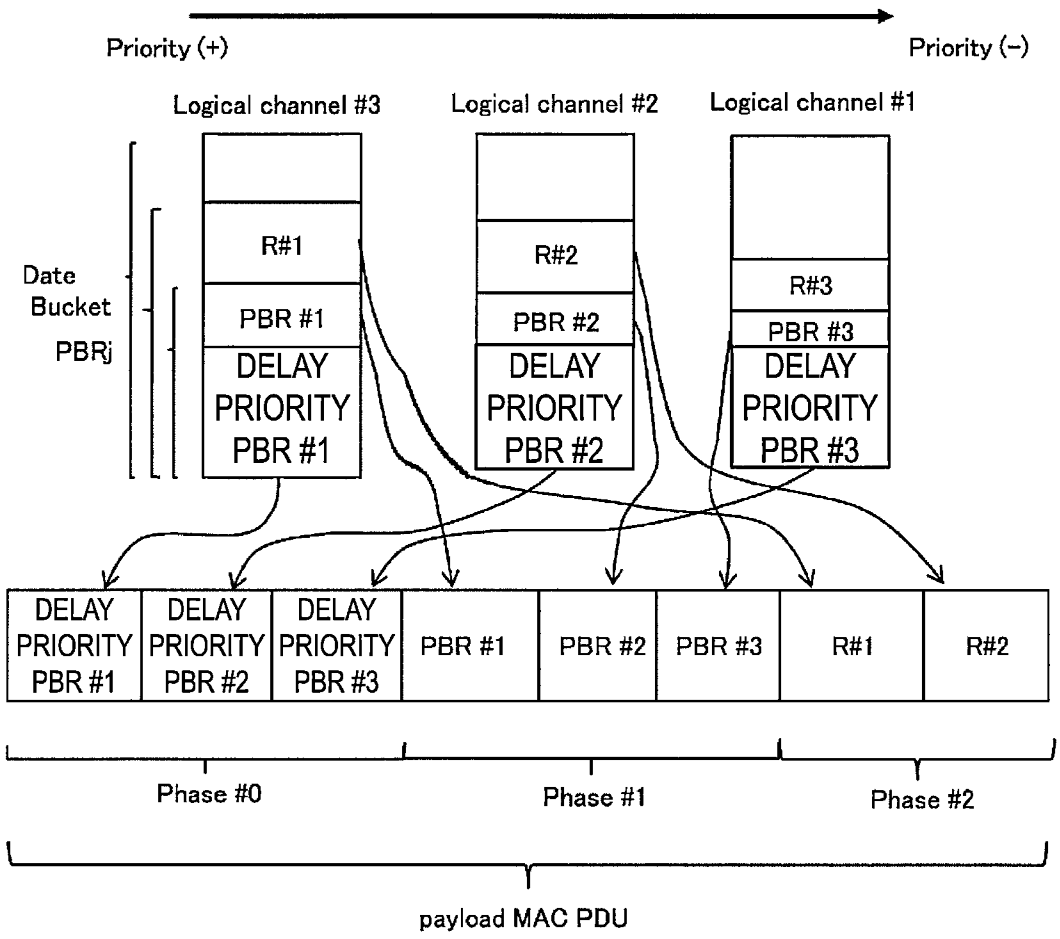
FIG. 14 is a diagram illustrating an example of delay priority PBR according to a third embodiment.

FIG. 14 is a diagram illustrating an example of the delay priority PBR. FIG. 14, similarly to FIG. 10, illustrates an example in which "Logical Channel #3" has the highest priority, and "Logical Channel #2" and "Logical Channel #1" have lower priorities in this order.

As illustrated in FIG. 14, a delay priority PBR #1 is configured for "Logical Channel #3". A delay priority PBR #2 is configured for "Logical Channel #2". A delay priority PBR #3 is configured for "Logical Channel #1".

The delay priority PBR is a bit rate allocable temporally earlier than the existing PBR.

First, the MAC layer 350 allocates a resource corresponding to the delay priority PBR #1 for "Logical Channel #3" having the highest priority to "Logical Channel #3". At this time, the MAC layer 350 acquires a delay time of each packet in "Logical Channel #3", and allocates the resource with giving priority to the packet having the longer delay time. Specifically, the MAC layer 350 acquires the delay time from each packet stored in the transmission buffer corresponding to "Logical Channel #3". As in the first embodiment and the like, the delay time as the hop count itself included in the BAP Data PDU or as a value calculated from the hop count may be used.

Second, the MAC layer 350 allocates a resource corresponding to the delay priority PBR #2 for "Logical Channel #2" having the second highest priority to "Logical Channel #2". At this time, the MAC layer 350 acquires a delay time of each packet in "Logical Channel #2", and allocates the resource with giving priority to the packet having the longer delay time. Also in this case, similarly to the acquisition of the delay time for "Logical Channel #3", the MAC layer 350 acquires the delay time from each packet stored in the transmission buffer corresponding to "Logical Channel #2". As the delay time, the hop count itself included in the BAP Data PDU or a value calculated from the hop count may be used.

Third, the MAC layer 350 allocates a resource corresponding to the delay priority PBR #3 for "Logical Channel #1" having the lowest priority to "Logical Channel #1". At this time, the MAC layer 350 acquires a delay time of each packet in "Logical Channel #1", and allocates the resource with giving priority to the packet having the longer delay time. Also in this case, the MAC layer 350 acquires the delay time from each packet stored in the transmission buffer corresponding to "Logical Channel #1". As the delay time, the hop count itself included in the BAP Data PDU or a value calculated from the hop count may be used.

As described above, the phase in which the resource corresponding to the delay priority PBR is allocated to each logical channel may be a 0th phase (Phase #0). After the 0th phase, the MAC layer 350 executes the first phase (Phase #1) and then the second phase (Phase #2) in the LCP processing.

A packet that can be transmitted at the delay priority PBR may be identified by a delay time threshold value. In other words, the gNB 200 (donor node) configures the value of the delay priority PBR and the threshold value related to a delay amount of the packet that can be transmitted at the delay priority PBR. The IAB node 300 (the MAC layer 350) applies the delay priority PBR to only a packet having a delay amount exceeding the threshold value and allocates a resource. When an amount of data of the target packet is below the delay priority PBR, the process may proceed to the resource allocation process for the logical channel having the next priority. When the amount of data of the target packet exceeds the delay priority PBR, the process may proceed to the resource allocation process for the logical channel having the next priority when the resource of the amount of data corresponding to the delay priority PBR is allocated.

Figure 15:
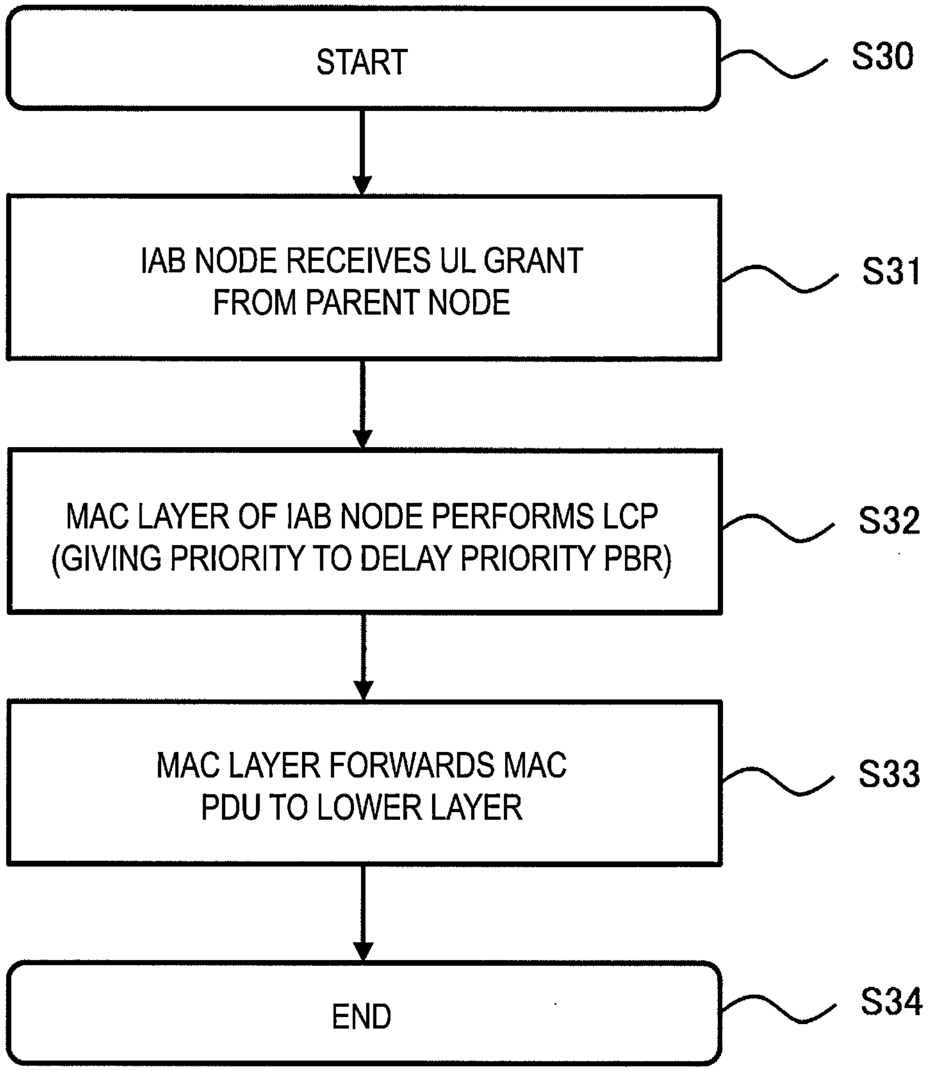
FIG. 15 is a flowchart illustrating an operation example according to the third embodiment.

FIG. 15 is a flowchart illustrating an operation example according to the third embodiment.

In step S30, the MAC layer 350 in the IAB-MT of the IAB node 300 starts processing.

In step S31, the MAC layer 350 receives the UL grant from the parent node.

In step S32, the MAC layer 350 performs the LCP processing. At this time, when the delay priority PBR is configured for the logical channel, the MAC layer 350 allocates a resource with giving more priority to the delay priority PBR than the existing PBR. The existing PBR is a PBR configured for each logical channel in the LCP processing. The configuration of the delay priority PBR may be performed by way of an RRC message by the donor node 200, or may be performed by way of a MAC CE or a BAP Control PDU by the parent node, for example. The MAC layer 350 assigns the delay priority PBR to the logical channel with giving priority to the packet having the longer delay time. When the allocation of the resource corresponding to the delay priority PBR is completed, the MAC layer 350 performs the normal LCP processing to generate a data block (payload MAC PDU).

In step S33, the MAC layer 350 provides the generated data block to the lower layer, and the data block is transmitted from the IAB node 300 to the parent node.

In step S34, the MAC layer 350 ends the series of processing operations.

As described above, in the third embodiment, the relay node (for example, the IAB node 300) allocates a delay priority resource to a logical channel, and then allocates a predetermined minimum resource guaranteed for the logical channel (for example, a resource corresponding to the PBR) to the logical channel. The relay node allocates the delay priority resource to the logical channel with giving more priority to the first packet than the second packet, the first packet having the longer delay time than the second packet.

According to the third embodiment, the IAB node 300 allocates the resource corresponding to the delay priority PBR to the logical channel for the delayed packet with a higher priority than the existing PBR. Therefore, in the multi-hop network, the IAB node 300 can transmit a delayed packet to the parent node in a prioritized manner.

The IAB node 300 allocates the resource corresponding to the delay priority PBR in the logical channel with giving priority to a packet having a longer delay time. Therefore, the IAB node 300 can execute priority control of packets in the logical channel.

Fourth Embodiment

A fourth embodiment is an example in which, when the delay times are different between the logical channels, a higher priority is assigned to the logical channel having a longer delay time in descending order of the delay time, and the priority is applied to the LCP. Specifically, first, the relay node (for example, the IAB node 300) measures first and second delay times until first and second untransmitted data to be transmitted to the parent node of the relay node via first and second logical channels reach the relay node, respectively. Second, the relay node assigns a priority in order from the second logical channel when the second delay time is longer than the first delay time, to allocate the resource for data transmission to the first and second logical channels according to the priority. As a result, the IAB node 300 can allocate the resource to the logical channel having the longer delay time than others in descending order of the delay time. Even in the entire multi-hop network, contribution to realize fairness is possible by eliminating the long delay time.

Figure 16:
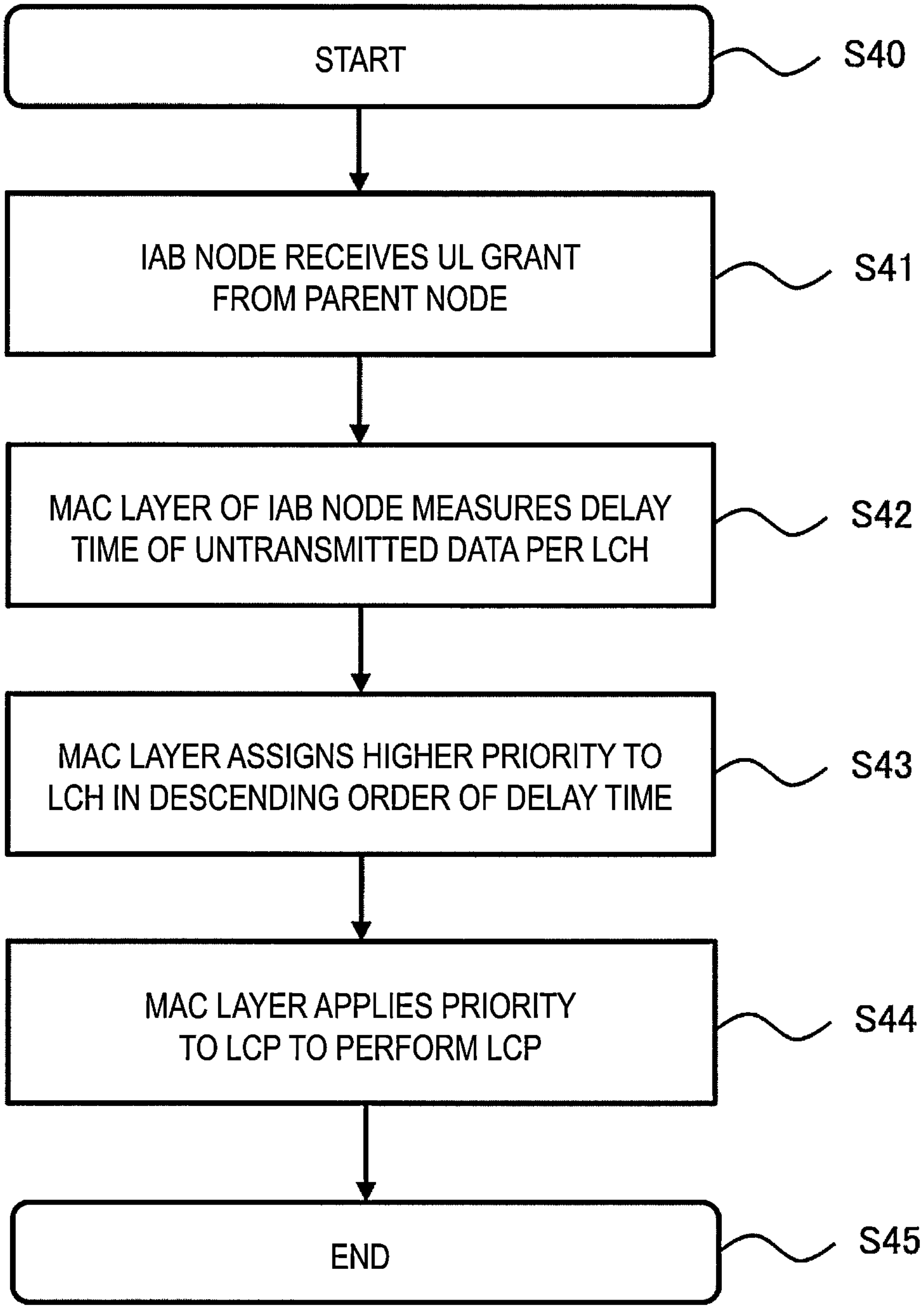
FIG. 16 is a flowchart illustrating an operation example according to a fourth embodiment.

FIG. 16 is a flowchart illustrating an operation example according to the fourth embodiment.

As illustrated in FIG. 16, in step S40, the MAC layer 350 in the IAB-MT of the IAB node 300 starts processing.

In step S41, the MAC layer 350 receives the UL grant from (the IAB-DU of) the parent node of the IAB node 300.

In step S42, the MAC layer 350 measures the delay time until the untransmitted data is transferred to the IAB node 300, for each logical channel. For example, the MAC layer 350 measures the delay time of the untransmitted data for each logical channel by measuring the delay time of the untransmitted data stored in the transmission buffer corresponding to each logical channel for each transmission buffer. The calculation itself of the delay time may be the same as and/or similar to the first embodiment. Specifically, the MAC layer 350 acquires hop counts from respective packets (for example, BAP Data PDU) stored in the transmission buffer corresponding to the target logical channel, and adds (or averages) those of all the packets stored in the transmission buffer. The added value or the average value is the delay time of the untransmitted data in the target logical channel. Note that the MAC layer 350, when already acquiring the delay time occurring in each logical channel, may use this delay time. The MAC layer 350 changes the target logical channel to another logical channel to use such another logical channel as the target logical channel, and measures the delay time of the target logical channel. By repeating this process, the MAC layer 350 can measure the delay time for each logical channel across all the logical channels.

In step S43, the MAC layer 350 assigns a higher priority to a logical channel having a longer delay time in descending order of the delay time. The MAC layer 350 may assign "1" which is the highest priority to the logical channel having the longest delay time. Such a dynamic change of the priority may be executed only when permitted (configured) by the gNB 200 (donor node). A logical channel (logical channel ID) whose priority may be dynamically changed may be further configured. The IAB node 300 performs a dynamic change of the priority only on the permitted logical channel. The IAB node 300 may notify the gNB 200 (donor node) when the IAB node 300 performs the dynamic change of the priority and/or stops the dynamic change of the priority (i.e., when the IAB node 300 returns the priority to that configured by the gNB 200). The notification may include information such as the logical channel ID as a target of the dynamic change of the priority and the changed priority.

In step S44, the MAC layer 350 applies the priority assigned in step S43 to the LCP to perform the LCP. For example, in FIG. 10, assume a case that the delay time of "Logical Channel #1" is the largest, the delay time of "Logical Channel #2" is the second largest, and the delay time of "Logical Channel #3" is the smallest. In this case, the MAC layer 350 assigns the highest priority to "Logical Channel #1", the second highest priority to "Logical Channel #2", and the lowest priority to "Logical Channel #3". The MAC layer 350 performs the resource allocation in the first phase (Phase #1) in the order of "Logical Channel #1", "Logical Channel #2", and "Logical Channel #3", and then performs the resource allocation in the second phase (Phase #2) in this order.

In step S45, the MAC layer 350 ends the series of processing operations.

Fifth Embodiment

A fifth embodiment is an example of introducing a UL grant dedicated to a delayed packet. Specifically, the second relay node, which is the parent node of the first relay node (e.g., the IAB node 300), transmits a special UL grant to the first relay node, the special UL grant enabling the first relay node to transmit only a delayed packet. Second, the first relay node transmits the delayed packet to the second relay node with a higher priority than an undelayed packet according to the special UL grant. As a result, the child node can transmit a delayed packet to the parent node in a prioritized manner.

Figure 17:
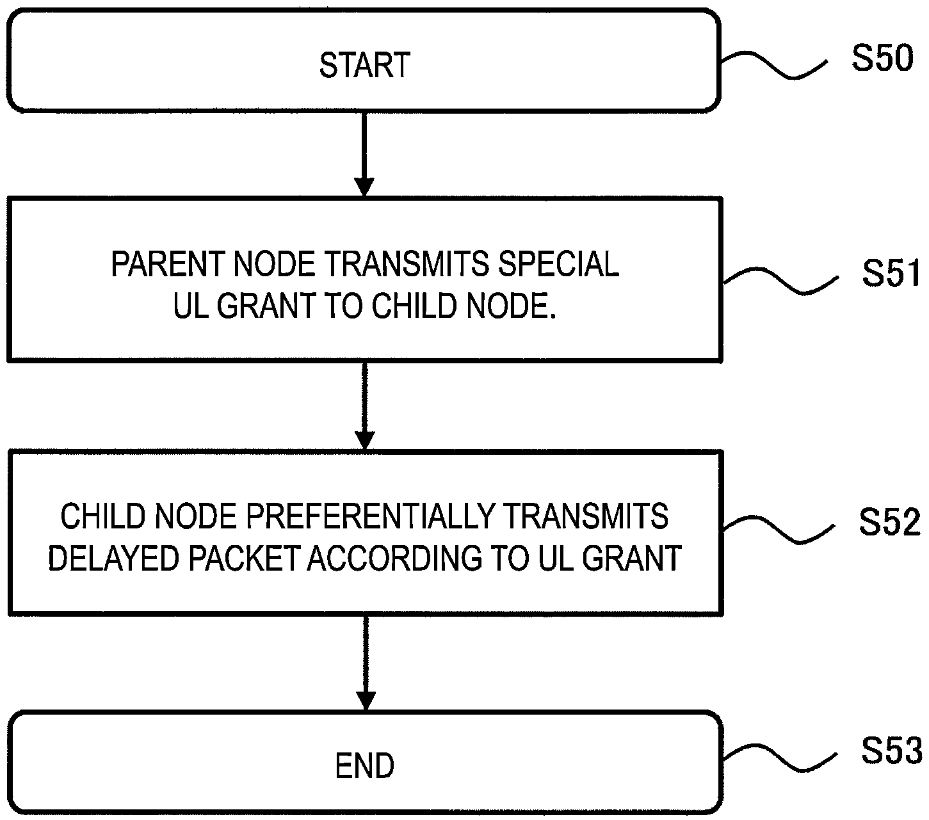
FIG. 17 is a flowchart illustrating an operation example according to a fifth embodiment.

FIG. 17 is a flowchart illustrating an operation example according to the fifth embodiment.

As illustrated in FIG. 17, in step S50, the parent node starts processing.

In step S51, the IAB-DU of the parent node transmits the special UL grant to the IAB-MT of the child node (IAB node 300). The special UL grant is a UL grant that enables an undelayed packet to be transmitted with a higher priority than a delayed packet. The special UL grant includes radio resource allocation information for the delayed packet.

First, the special UL grant may be a UL grant enabling only a packet whose hop count has a certain value or more to be transmitted. The hop count is, for example, additional information (A2) included in the header of the BAP Data PDU. In this case, the child node receiving the special UL grant transmits only the BAP Data PDU whose hop count has a certain value or more to the parent node. For example, the certain value may be notified by way of the MAC CE or the BAP Control PDU from a further parent node of the parent node, or may be configured by way of the RRC message by the donor node 200.

Second, the special UL grant may be a UL grant including meaning of an instruction (or trigger) to perform the special LCP described in the first to fourth embodiments. In this case, the child node receiving the special UL grant perform any one of the special LCP processing operations described in the first to fourth embodiments.

Third, the parent node may determine whether to transmit the special UL grant to the child node based on the header information of the BAP Data PDU or the like received in the past. For example, when the average of the hop counts included in the headers of the BAP Data PDUs received from the child node in the past exceeds the threshold value, the parent node determines to transmit the special UL grant to the child node. Alternatively, when the hop count included in the header of a certain BAP Data PDU received from the child node in the past exceeds the upper limit value, the parent node may determine to transmit the special UL grant to the child node.

Fourth, the parent node may simultaneously transmit a normal UL grant and a special UL grant to the child node. The normal UL grant is a UL grant including a radio resource used for UL transmission regardless of delay. The child node transmits to the parent node the undelayed packet by using the radio resource in the normal UL grant, and transmits to the parent node the delayed packet by using the radio resource in the special UL grant. Alternatively, one UL grant may include both a radio resource corresponding to a normal UL grant and a radio resource corresponding to a special UL grant. In this case, in one UL grant, a portion (radio resource) corresponding to the normal UL grant and a portion corresponding to the special UL grant may be formed to be respectively designated. In one UL grant, two portions may be formed to be identifiable.

In step S52, the child node transmits the delayed packet with a higher priority than other undelayed packets according to the special UL grant received from the parent node.

In step S53, the child node terminates a series of processing operations.

Sixth Embodiment

A sixth embodiment is described while focusing on differences from the above-described first embodiment.

BSR

Figure 18:
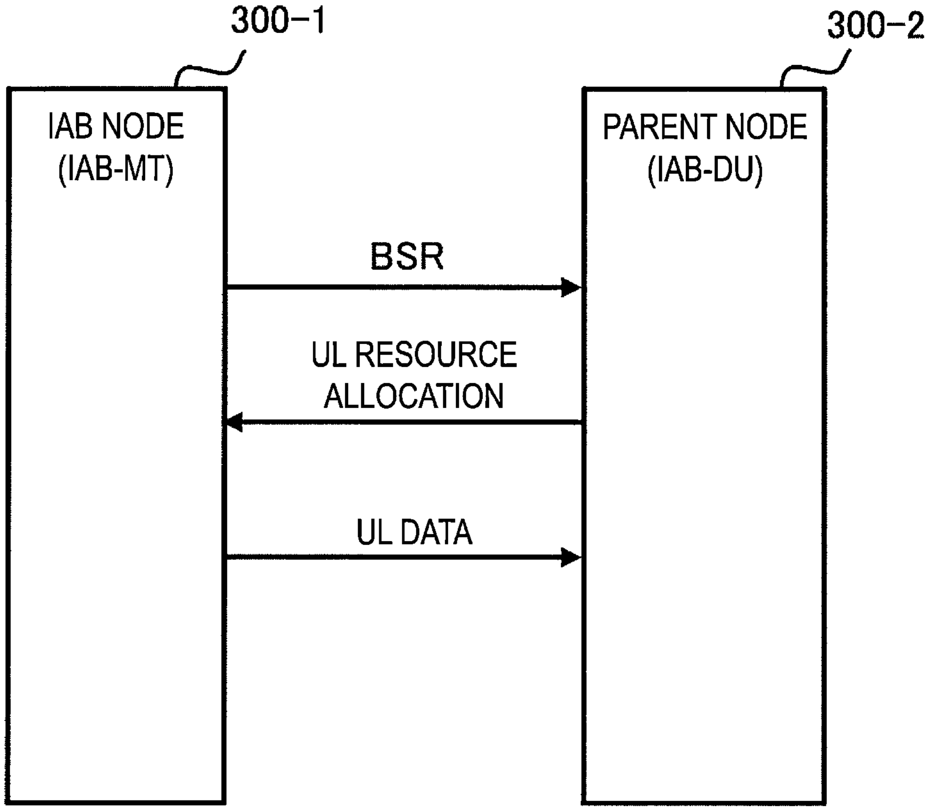
FIG. 18 is a diagram illustrating an example of a BSR according to a sixth embodiment.

FIG. 18 is a diagram illustrating an example of a BSR according to the sixth embodiment.

As illustrated in FIG. 18, the MAC layer 350 in the IAB-MT of the IAB node 300-1 includes a function to transmit, by the BSR, the amount of data in the transmission buffer corresponding to each logical channel. The MAC layer 350 assigns each logical channel to a logical channel group (LCG) and transmits the amount of transmission buffer for each LCG as a message of the MAC layer 350 to the parent node 300-2. The IAB-DU of the parent node 300-2 allocates an uplink radio resource to the IAB-MT of the IAB node 300 based on the BSR.

Note that the PHY layer of the IAB node 300-1 transmits the BSR to the parent node 300-2 using a PUSCH (physical uplink shared channel).

Communication Control Method According to Sixth Embodiment

In the first embodiment, the example is described in which the delay time in the logical channel is measured, and when the delay time satisfies a certain condition, the resource allocation of equal to or greater than the PBR is performed on the logical channel.

In contrast, the sixth embodiment is an example in which a "delay value" based on a delay time is calculated and reported to the parent node of the IAB node 300 using a BSR. The "delay value" is, for example, an index value representing a delay time for each logical channel.

Specifically, the first relay node (for example, the IAB node 300-1) that is a child node of the second relay node (for example, the IAB node 300-2) calculates a delay value of a packet stored in the transmission buffer. Second, the first relay node transmits the delay value to the second relay node using a buffer status report (BSR). Third, the second relay node allocates a radio resource to the first relay node based on the delay value.

As described above, according to the sixth embodiment, the parent node can allocate un uplink radio resource to the child node in consideration of the "delay value" based on the delay time. Therefore, the parent node can allocate more uplink radio resources to the child node in which a delay occurs than to other child nodes.

Figure 19:
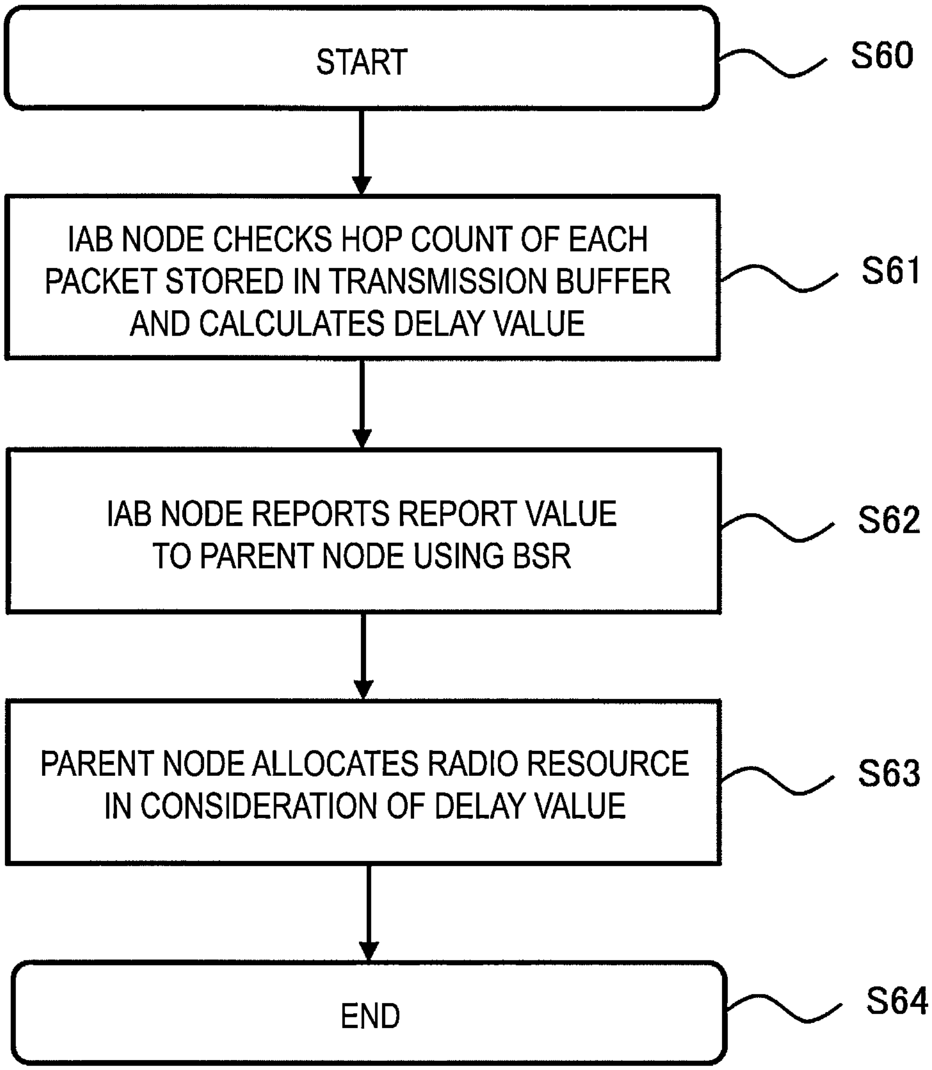
FIG. 19 is a flowchart illustrating an operation example according to the sixth embodiment.

FIG. 19 is a flowchart illustrating an operation example according to the sixth embodiment.

As illustrated in FIG. 19, in step S60, the MAC layer 350 in the IAB-MT of the IAB node 300-1 starts processing.

In step S61, the MAC layer 350 checks the hop count of the packet stored in the transmission buffer and calculates a "delay value". The transmission buffer is associated with each logical channel. Therefore, the number of transmission buffers existing is equal to the number of logical channels. The MAC layer 350 checks the hop counts of all packets stored in each transmission buffer to calculate the "delay value" for each logical channel. Specifically, the calculation is performed as follows, for example.

First, the MAC layer 350 may calculate the "delay value" based on the hop count. Specifically, when the packet is the BAP Data PDU, the MAC layer 350 acquires the hop count included in the header of the BAP Data PDU from that header. The MAC layer 350 acquires the hop counts for all BAP Data PDUs stored in the transmission buffer to calculate an average value (or a maximum value, or a minimum value) of these hop counts. In this case, the average value or the like is referred to as the "delay value".

Second, the MAC layer 350 may calculate the "delay value" for each logical channel based on the measured value for each hop received from the donor node 200. Specifically, the MAC layer 350 acquires the hop count from the packet stored in the transmission buffer, and multiplies the hop count by the measured value received from the donor node 200. The MAC layer 350 calculates an average value (or a maximum value or a minimum value) of the multiplication values for all the packets stored in the transmission buffer. In this case, the average value or the like is referred to as the "delay value".

Third, the MAC layer 350, when knowing the delay time already occurring, may use this delay time. Specifically, the MAC layer 350 uses a time stamp included in the header of the BAP Data PDU stored in the transmission buffer. The time stamp represents the time at which an access IAB node (the IAB node that forms an access link with the UE 100) transmitted a UL packet. The MAC layer 350 of the IAB node (intermediate IAB node) 300-1 intermediating in the topology acquires a delay time from a difference between a reception time of the UL packet and the time stamp. The MAC layer 350 acquires the delay times for all packets stored in the transmission buffer to calculate an average value (or a maximum value or a minimum value) of these delay times. In this case, the average value or the like is referred to as the "delay value".

The MAC layer 350 calculates the "delay value" for each logical channel as described above.

In step S62, the MAC layer 350 reports the "delay value" to the parent node 300-2 using the BSR. For example, when a plurality of child nodes exist for the parent node 300-2, each child node reports the "delay value" for each logical channel calculated by itself to the parent node 300-2.

In step S63, the IAB-DU of the parent node 300-2 allocates a radio resource to the child node (IAB node 300-1) in consideration of the "delay value". For example, the IAB-DU of the parent node 300-2 allocates the uplink radio resource to the child node (for example, the IAB node 300-1) storing the packet of the logical channel having the largest "delay value" with a higher priority than the other child nodes. Alternatively, the IAB-DU of the parent node 300-2 may transmit the special UL grant according to the fifth embodiment to the child node (for example, the IAB node 300-1) storing the packet of the logical channel having the largest "delay value".

OTHER EMBODIMENTS

A program causing a computer to execute each type of processing performed by the UE 100, the gNB 200, or the IAB node 300 may be provided. The program may be recorded in a computer readable medium. Use of the computer readable medium enables the program to be installed on a computer. Here, the computer readable medium on which the program is recorded may be a non-transitory recording medium. The non-transitory recording medium is not particularly limited, and may be, for example, a recording medium such as a CD-ROM or a DVD-ROM.

Circuits for executing each type of processing to be performed by the UE 100, the gNB 200, or the IAB node 300 may be integrated, and at least part of the UE 100, the gNB 200, or the IAB node 300 may be configured as a semiconductor integrated circuit (a chipset or an SoC).

Although embodiments have been described in detail with reference to the drawings, a specific configuration is not limited to those described above, and various design modifications and the like can be made without departing from the scope of the present disclosure. All of or a part of the embodiments can be combined together as long as no inconsistencies are introduced.

Supplementary Note

Topology-Wide Fairness

IF-4

IF-4 is defined as follows.

IF-4: the IAB node cannot give more resources to a BH RLC channel that aggregate more bearers and/or carry bearers with higher load per bearer (i.e., IAB node cannot give more resources to the BH RLC channel with higher aggregate load).

The discussion in e-mail already lists relevant solutions. According to the list, possible solutions for IF-4 are as follows:

F1: the IAB node is configured with additional information by the CU.

F1-1: concerning the number of bearers of a specific BH RLC channel (e.g., real number, average number).

F1-2: concerning the QoS of the bearer in a specific BH RLC channel.

F2: add additional information to the BAP header.

F2-1: bearer ID

F2-2: bearer ID and the number of hops of specific path

F2-3: the number of UE DRBs in a specific BAP packet

The F1 solution is only configured once, for example together with the routing configuration. Specifically, these are simple and low overhead solutions that enable better scheduling "per RLC channel". However, these cannot be used for prioritization "in units of packets" in DL scheduling.

The F2 solution is added to each BAP header and enables scheduling "in units of packets". However, it is clear that these require more overhead in each BAP PDU.

In terms of improvement of the fairness, it can be considered that scheduling "in units of packets" is technically superior to scheduling "in units of RLC channels". These scheduling may be done in the gNB (or IAB-DU) scheduler for DL. On the other hand, in the UL, the LCP basically provides scheduling "in units of RLC channels". In this sense, it may not be necessary to perform scheduling "in units of packets" only in the DL, in consideration of more overhead in all BAP PDUs in the DL and UL. Therefore, a simple solution, i.e., the F1 solution, is considered desirable for improving the fairness of the entire topology in Rel-17.

Proposal 1: The RAN2 needs to agree that the IAB donor configures the number of bearers mapped to each BH RLC channel and the QoS of these bearers for the IAB node, i.e., F1-1 and F1-2 are used to resolve IF-4.

Congestion Mitigation

IC-1 and IC-7

IC-1 and IC-7 are defined with the following remarks.

The R2 has determined that each company has a sufficiently high interest in the following two problems.

IC-1: long periods of downstream congestion on a single link cannot be mitigated using existing Rel-16 DL HbH flow control mechanisms without relying on packet dropping.

IC-7: the CU cannot update the congested path (because it does not know the local congestion status).

Both IC-1 and CI-7 are related to the RAN3. Since the RAN3 also seems to be working, how far the R2 works is currently unknown.

In the RAN3, congestion indication is discussed and the following contents are agreed. The CP-based congestion indication may include reporting.

per BAP routing ID, and/or per child link and/or

BH RLC channel ID (down-selection is FFS).

The CP-based congestion indication reuses the F1AP GNB-DU status indication procedure.

The CP-based congestion indication is related to DL congestion.

For the UP-based approach for IAB congestion mitigation, consider two following options.

no functional extension.

packet marking based approach

When the IAB donor receives a congestion indication from the IAB node, it is assumed that the IAB donor can avoid a congested path, as implied in the RAN2 agreement above. Specifically, it can be considered that two procedures exist, one of the two procedures allowing the IAB donor to update the routing configuration and the other of the two procedures allowing the IAB donor to indicate local rerouting. In the latter case, the RAN2 may be involved in how the congestion indication is used. In any case, the RAN2 should wait for the RAN3 progress at this point of time.

Observation 4: the RAN2 may be involved in how the IAB donor takes an action with the congestion indication after the RAN3 is aware of the details.

The invention claimed is:

1. A communication control method performed by a relay node, the communication control method comprising:

measuring, by the relay node, a delay time until untransmitted data to be transmitted to a parent node of the relay node via a logical channel is transferred to the relay node; and allocating, by the relay node, a resource for data transmission to the logical channel, based on the delay time, wherein the allocating comprises allocating, by the relay node, the resource more than a predetermined resource to the logical channel regardless of a priority configured for the logical channel, when the delay time reaches a predetermined time, the predetermined time is a time shorter than an upper limit time configured for the logical channel, and the predetermined resource is a minimum resource guaranteed for the logical channel.

2. The communication control method according to claim 1, wherein the measuring comprises measuring, by the relay node, the delay time based on hop count information included in a Backhaul Adaptation Protocol (BAP) Data Protocol Data Unit (PDU) of the untransmitted data.

3. A communication control method performed by a relay node, the communication control method comprising:

measuring, by the relay node, a delay time until untransmitted data to be transmitted to a parent node of the relay node via a logical channel is transferred to the relay node; and allocating, by the relay node, a resource for data transmission to the logical channel, based on the delay time, wherein the measuring comprises measuring, by the relay node, a first delay time and a second delay time individually, the first delay time being a time until a first untransmitted data to be transmitted to the parent node via a first logical channel is transferred to the relay node, and the second delay time being a time until a second untransmitted data to be transmitted to the parent node via a second logical channel is transferred to the relay node, and the allocating comprises, by the relay node, allocating priorities in prioritized order from the second logical channel when the second delay time is longer than the first delay time, and allocating the resource for data transmission to the first and second logical channels according to the priorities.

4. The communication control method according to claim 3, wherein the measuring comprises measuring, by the relay node, the delay time based on hop count information included in a Backhaul Adaptation Protocol (BAP) Data Protocol Data Unit (PDU) of the untransmitted data.

5. A communication control method performed by a relay node, the communication control method comprising:

acquiring, by the relay node, a first delay time and a second delay time individually, the first delay time being a time until a first packet to be transmitted to a parent node of the relay node through a logical channel is transferred to the relay node, and the second delay time being a time until a second packet to be transmitted to the parent node of the relay node through a logical channel is transferred to the relay node; and allocating, by the relay node, a resource for data transmission to the logical channel with the second packet being prioritized over the first packet when the second delay time is longer than the first delay time.

6. The communication control method according to claim 5, wherein the allocating comprises allocating, by the relay node, a predetermined resource minimally guaranteed for the logical channel to the logical channel after allocating a delay priority resource to the logical channel, and allocating, by the relay node, the delay priority resource to the logical channel with the first packet being prioritized over the second packet, and the predetermined resource is a minimum resource guaranteed for the logical channel.

7. The communication control method according to claim 5, wherein the measuring comprises measuring the delay time based on hop count information included in a Backhaul Adaptation Protocol (BAP) Data Protocol Data Unit (PDU) of the untransmitted data.

* * * * *